US012779478B2

(12) United States Patent
Hofman

(10) Patent No.: US 12,779,478 B2
(45) Date of Patent: Nov. 3, 2026

(54) HANDHELD SHOWERHEAD AND WALL MOUNT ASSEMBLY

(71) Applicant: ETL, LLC, Sparks, NV (US)

(72) Inventor: David Hofman, Reno, NV (US)

(73) Assignee: ETL, LLC, Sparks, NV (US)

( * ) Notice: Subject to any disclaimer, the term of this patent is extended or adjusted under 35 U.S.C. 154(b) by 157 days.

(21) Appl. No.: 18/911,137

(22) Filed: Oct. 9, 2024

(65) Prior Publication Data

US 2025/0170593 A1 May 29, 2025

Related U.S. Application Data

(60) Provisional application No. 63/603,206, filed on Nov. 28, 2023.

(51) Int. Cl.
*B05B 1/18* (2006.01)
*B05B 1/16* (2006.01)
(Continued)

(52) U.S. Cl.
CPC .............. *B05B 1/185* (2013.01); *B05B 1/169* (2013.01); *B05B 12/16* (2018.02); *E03C 1/0409* (2013.01);
(Continued)

(58) Field of Classification Search
CPC ......... B05B 15/63; B05B 15/60; B05B 15/62; B05B 1/18–185; A47J 47/16; A47G 29/08; F16B 2200/20–205; F16B 47/00–006; F16B 45/00; B25H 3/04; A47K 2201/00–02; A47K 2210/00; A47K 10/12; A47K 3/03; A47K 3/28; A47K 3/281; F16M 13/02; E03C 1/06; E03C 1/066; E03C 1/0409; A61H 2201/1695; A61H 2205/021; A61H 39/04; A61H 7/003
See application file for complete search history.

(56) References Cited

U.S. PATENT DOCUMENTS 2,086,017 A 7/1937 Donahue
2,893,644 A * 7/1959 Holden ................. B05B 15/654
239/289
(Continued)

FOREIGN PATENT DOCUMENTS

CN 209597456 U 11/2019
CN 218190343 U 1/2023
(Continued)

*Primary Examiner* — Tuongminh N Pham
(74) *Attorney, Agent, or Firm* — ONE LLP

(57) ABSTRACT

A handheld showerhead assembly is provided which is especially constructed for handheld use. The handheld showerhead assembly includes a mushroom shaped finger lock having a shaft and a radially extending flange. In addition, the handheld showerhead assembly includes a wall mount. The wall mount includes a backplate for attaching to a wall and a cup. The cup includes a front side having two teeth separated to form a center recess. The cup is sufficiently large to receive the finger lock's radially extending flange, and the center recess is sized sufficiently large to receive the finger lock's shaft. Preferably, the handheld portion of the showerhead includes radially and longitudinally extending ridges for increased gripping capability.

3 Claims, 29 Drawing Sheets

(51) Int. Cl.

| | |
|---|---|
| ***B05B 12/16*** | (2018.01) |
| ***E03C 1/04*** | (2006.01) |
| ***E03C 1/046*** | (2006.01) |
| ***E03C 1/06*** | (2006.01) |
| ***F16B 47/00*** | (2006.01) |

(52) U.S. Cl.

CPC .............. *E03C 1/046* (2013.01); *E03C 1/066* (2013.01); *F16B 47/00* (2013.01)

(56) References Cited

U.S. PATENT DOCUMENTS

| | | | | | |
|---|---|---|---|---|---|
| 4,911,310 | A * | 3/1990 | Raishe | A47J 47/16 | 248/312 |
| 5,433,384 | A | 7/1995 | Chan et al. | | |
| 6,003,691 | A * | 12/1999 | Owen | A47B 81/02 | 211/65 |
| 6,622,945 | B1 | 9/2003 | Wu et al. | | |
| 11,371,225 | B2 | 6/2022 | Lin et al. | | |
| 2021/0346897 | A1 | 11/2021 | Garcia Villarreal | | |

FOREIGN PATENT DOCUMENTS

| | | | |
|---|---|---|---|
| KR | 102035807 | B1 | 11/2019 |
| KR | 20200059383 | A | 5/2020 |
| KR | 20210002244 | U | 10/2021 |
| KR | 102403446 | B1 | 5/2022 |

* cited by examiner

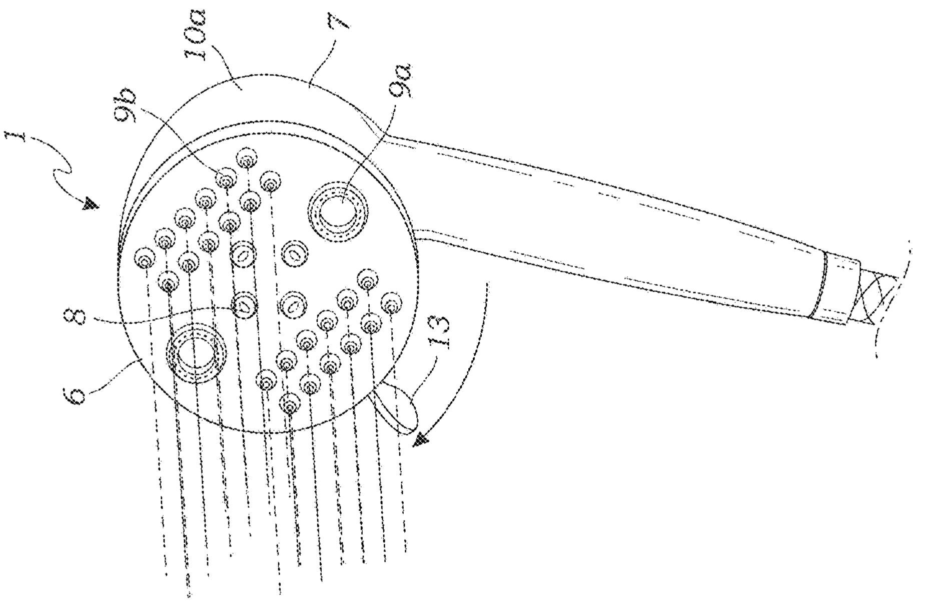
FIG. 59
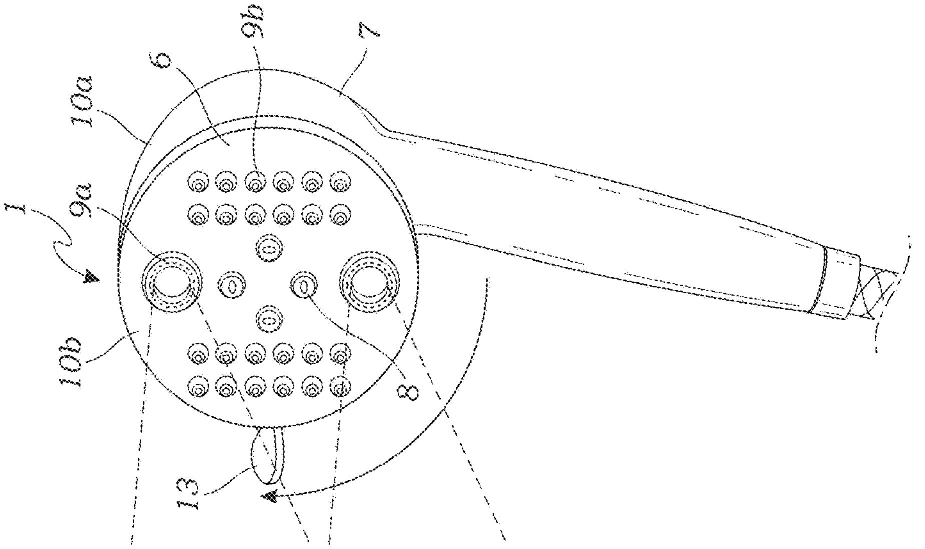
FIG. 58
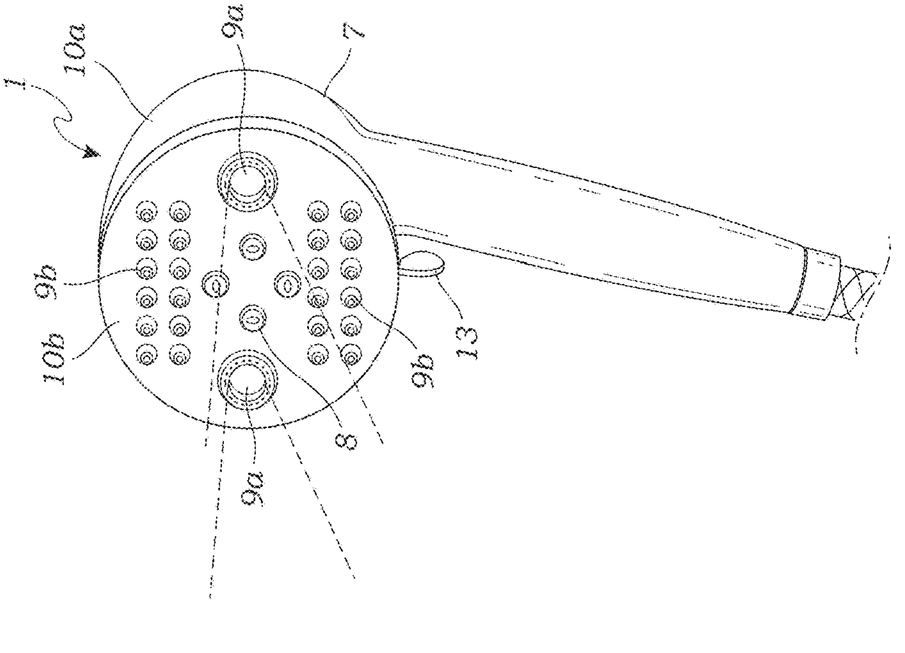
FIG.. 57

HANDHELD SHOWERHEAD AND WALL MOUNT ASSEMBLY

CROSS-REFERENCE TO RELATED APPLICATIONS

The present application claims priority to United States Provisional Patent Application Ser. No. 63/603,206 filed on Nov. 28, 2023.

BACKGROUND OF THE INVENTION

The present invention relates to showerheads. More particularly, the present invention relates to handheld showerhead spray assemblies with adjustable and oscillating spray patterns.

Showerheads are commercially available in numerous designs and configurations for use in showers, faucets, spas, sprinklers and other personal and industrial systems. The vast majority of showerheads include spray heads which provide constant or pulsed sprays and have either fixed or adjustable openings. Stationary spray heads with fixed jets are the simplest constructions consisting essentially of a central conduit connected to one or more hollow spray nozzles directed to produce a constant pattern. The stationary spray showerheads cause water to flow through the construction to contact essentially the same points on a user's body in a repetitive fashion.

Multifunction showerheads are able to deliver water in many different spray patterns such as a fine spray, a coarse spray, a pulsating spray, or even a flood pattern providing high fluid flow but decreased velocity. Of course, many other spray patterns may also be provided. A conventional multifunction showerhead generally requires the user to turn a selector ring or dial on the showerhead faceplate in order to select a desired function. Other common constructions include a faceplate with spray jets located in concentric circular patterns. An internal controller, such as controlled by buttons or the like, may be operated to direct the incoming water to any of the various patterns. Examples of such constructions are disclosed in U.S. Pat. Nos. 5,433,384 and 6,622,945.

Many showerhead assemblies allow users to manipulate spray nozzles into various positions and alignments to assist in the cleaning process. Advantageously, some showerhead assemblies include spray nozzles which can direct water to different locations within a shower stall, allowing water to contact desired locations on a user's body. Recently, showerhead assemblies have included settings which allow water to shift from outer and inner nozzles, causing water to project at varying directions onto the user. Unfortunately, these constructions still don't provide the adjustability and features desired by bathers.

Thus, it would be advantageous to provide a showerhead assembly that included an easy-to-manipulate controller for selecting various nozzle sets containing different spray patterns and multiple nozzles so as to enable the user to create unique shower experiences.

Further, it would further be advantageous to provide a showerhead assembly that included a showerhead with one or more oscillating nozzles so as to create a reciprocating spray pattern.

Moreover, it would be desirable to provide a showerhead with spray patterns that can be altered or rotated based on the user's preferences.

Finally, it would be advantageous if the showerhead were handheld and included features that increased a user's ability to hold and manipulated the showerhead, and also allow a bather to mount the showerhead to a shower wall.

SUMMARY OF THE INVENTION

The present invention addresses the aforementioned disadvantages by providing improved showerhead assemblies. Each of the assemblies include the traditional components typically found in a showerhead assembly including a showerhead having a face, a back side and a plurality of nozzles. In addition, the showerhead assemblies include an intake, such as a male threaded coupling, for connecting to a water source. Preferably, the water source is a flexible hose which allows a bather to freely manipulate the showerhead.

In a first aspect of the invention, the showerhead is especially constructed to be held by bather's hand or mounted to a shower wall. To this end, the showerhead assembly includes a mushroom shaped finger lock and a surface mount. The finger lock's mushroom shape is formed by including a narrow shaft which extends rearwardly from the showerhead to a radially extending flange. The showerhead assembly further includes a wall mount for holding the mushroom shaped finger lock. The wall mount includes a backplate, a cup, and a fastener which affixes the backplate to a surface, such as a shower wall. The cup extends forwardly from the backplate and includes a pair of teeth. The two teeth and backplate are spaced apart from each other to form a trough of sufficient size to receive the finger lock's flange. Further, the two teeth are spaced apart from one another to form a center recess which is sized to accept the finger lock's shaft. However, the center recess is not so large as to allow the finger lock's flange to pass through. Preferred fasteners for attaching the surface mount's back plate to a surface include a suction cup, threaded fasteners, or an adhesive.

In another aspect of the invention, a preferred showerhead assembly includes a showerhead having a non-rotatable section and rotatable section. The rotatable section forms the face of the showerhead and is affixed to the non-rotatable section by a fluid tight connection. Preferably the non-rotatable section has both hollow primary nozzles and hollow supplemental nozzles. Furthermore, the non-rotating section includes one or more outlets positioned to sequentially align with one or more inlets located on the showerhead's rotating section such that rotation of the rotatable section causes the showerhead to produce the same spray pattern in different orientations, such as vertical or horizontal, or to produce different spray patterns from different sets of nozzles. In one embodiment, the non-rotating section includes one outlet that selectively and sequentially aligns with two or more inlets found in the showerhead's rotating section. In another embodiment, the non-rotating section includes two or more outlets that selectively align with a single inlet found in the showerhead's rotating section. Preferably, both the non-rotatable section and rotatable section include exterior ridges. The ridges may extend circumferentially or longitudinally.

In still another aspect of the invention, preferred showerheads include oscillating nozzles which spray water from side-to-side or up-and-down. Various constructions are disclosed for oscillating one or more nozzles. In one embodiment, each nozzle is alternatively supplied by water through one of two port holes. The port holes extend through an obstructor plate which slides against the backside of the showerhead's faceplate. The obstructor plate's port holes are spaced apart so that only one port hole can spray water through a nozzle at any one moment. Back-and-forth movement of the obstructor plate against the face plate's backside causes the ports to alternatively and sequentially open and close. Preferably, the port holes are angled in different directions so that as a first port hole closes from spraying water in a first direction, a second port hole opens and commences spraying water in an opposite direction so that the nozzle provides an oscillating spray pattern. The obstructor plate is preferably oscillated back-and-forth by a gear train including a propeller which drives gears, including a sun gear, a ring gear and a planet gear, so as to rotate an offset pin.

Thus, it is one object to provide a showerhead that can be more easily manipulated by a bather and mounted to a wall.

Also, it is another object to provide a showerhead that includes a controller that enables a bather to both switch sets of nozzles that spray water, and also allows a bather to rotate the alignment of the showerhead nozzles.

Moreover, it is an object of the invention to provide a showerhead having improved oscillating nozzles compared to previous showerheads.

Other features and advantages of the present invention will be appreciated by those skilled in the art upon reading the detailed description which follows with reference to the drawings.

BRIEF DESCRIPTION OF THE DRAWINGS

These and other, further and more specific objects of the invention will be apparent to those skilled in the art from the following detailed description thereof, taken in conjunction with the Drawings, in which:

FIG. 57 is a is a front perspective view of a handheld showerhead including a central set of primary nozzles, and two sets of supplemental nozzles wherein the showerhead's rotatable section has been rotated to spray water from one of the sets of supplemental nozzles in a horizontal pattern;

FIG. 58 is a is a front perspective view of the handheld showerhead shown in FIG. 57 wherein the showerhead's rotatable section has been rotated to spray water from one of the sets of supplemental nozzles in a vertical pattern;

FIG. 59 is a is a front perspective view of the handheld showerhead shown in FIG. 57 wherein the showerhead's rotatable section has been rotated to spray water from the second of the sets of supplemental nozzles in an angled pattern;

DETAILED DESCRIPTION OF THE INVENTION

Figure 1:
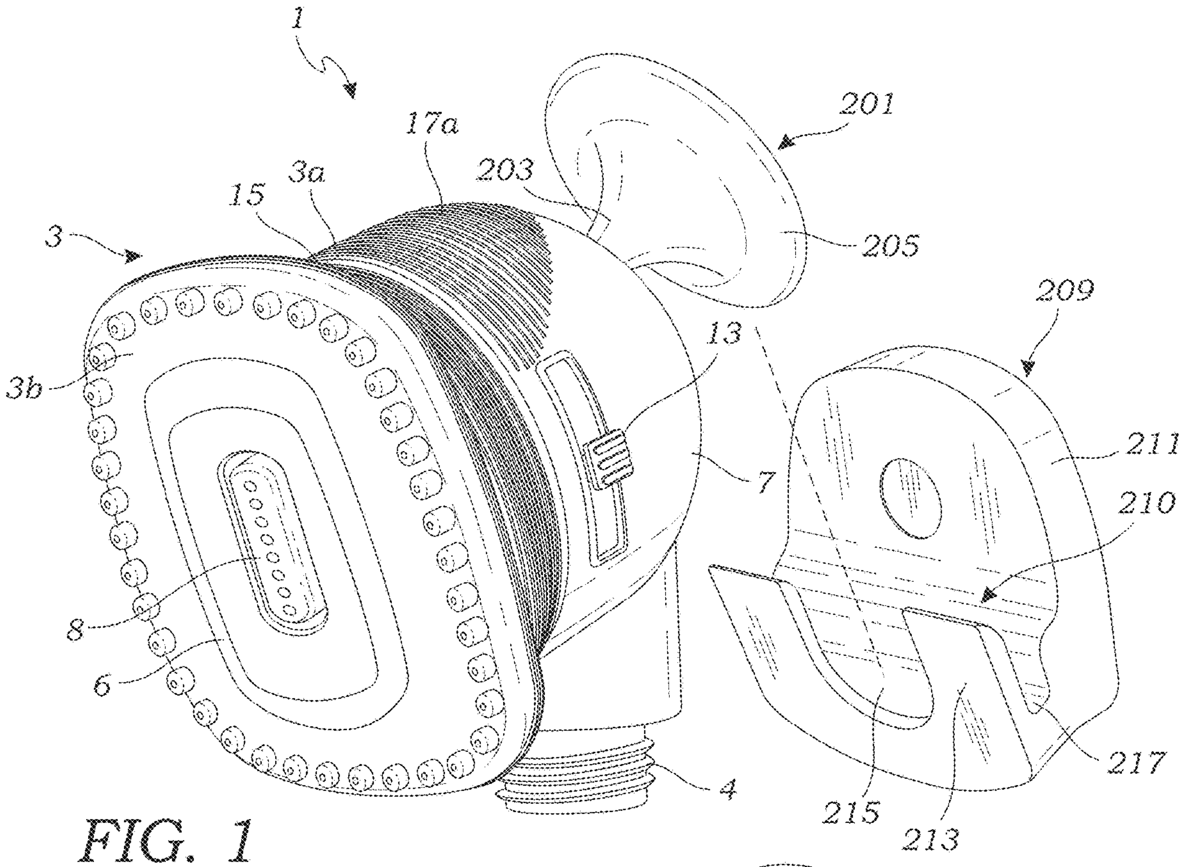
FIG. 1 is a left perspective view of a first embodiment of a handheld showerhead assembly includes a mushroom shaped finger lock and wherein the showerhead is disengaged from a surface mount and the showerhead's primary nozzles are vertically oriented.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

Figure 63:
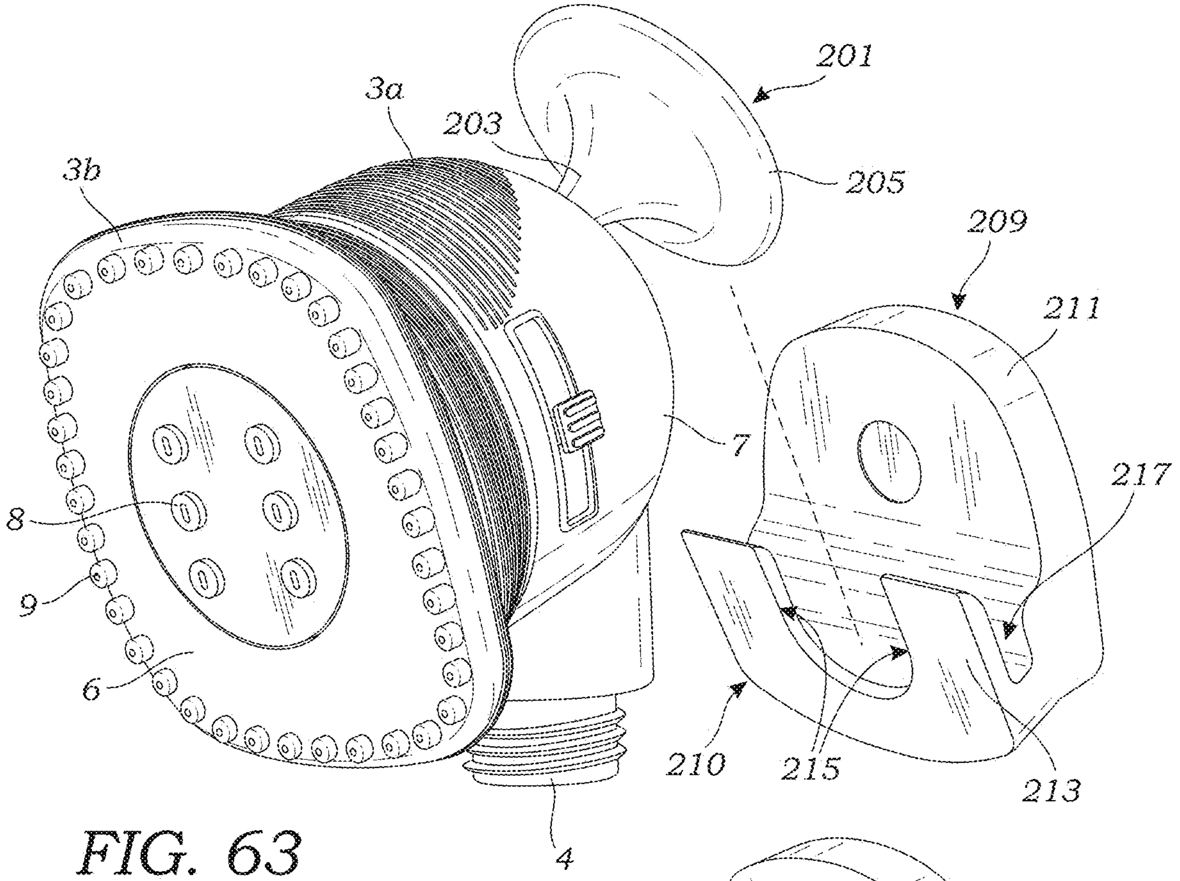
FIG. 63 is a left perspective view of an alternative embodiment of a handheld showerhead assembly wherein the showerhead is disengaged from a surface mount and the showerhead primary nozzles are vertically oriented.
Figure 64:
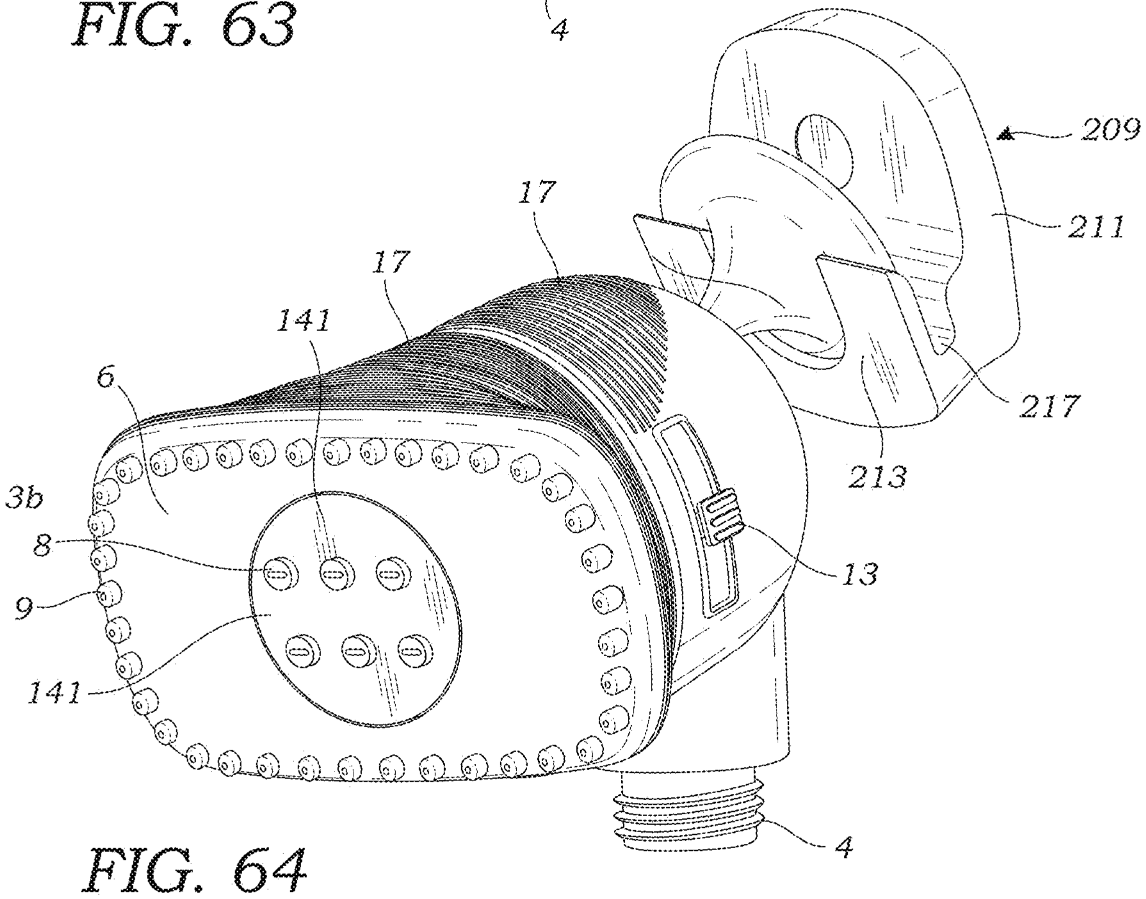
FIG. 64 is a left perspective view of the handheld showerhead assembly illustrated in FIG. 63 wherein the showerhead is engaged with a surface mount.

With reference to FIGS. 1-63, the showerhead assembly 1 includes a showerhead 3 having a face 6, a back side 7 and a plurality of nozzles. The showerhead 3 is intended to be manipulated easily by a bather's hand, but the showerhead assembly does not include a traditional handle. Instead, the showerhead assembly includes a short neck portion including a male threaded intake 4 which extends downwardly from the showerhead 3. The male threaded intake 4 is intended to be connected to a flexible hose (not shown) which in turn is connected to a water source such as a pipe. The showerhead assembly 1 further includes a mushroom-shaped finger lock 201 and a surface mount 209, which will be described in greater detail below.

The showerhead 3 Furthermore, with reference to FIGS. 1-9; 16-20; and 46-64, the preferred showerhead 3 includes a non-rotatable section 3*a* and a rotatable section 3*b*. The rotatable section 3*b* may be affixed to the non-rotatable section 3*a* by any fluid tight connection as can be determined by those skilled in the art, including a press fit attachment or interlocking flanges. Preferably, one or more gaskets (not shown) are provided to provide the fluid tight seal between the non-rotatable section 3*a* and the rotatable section 3*b*.

Figure 2:
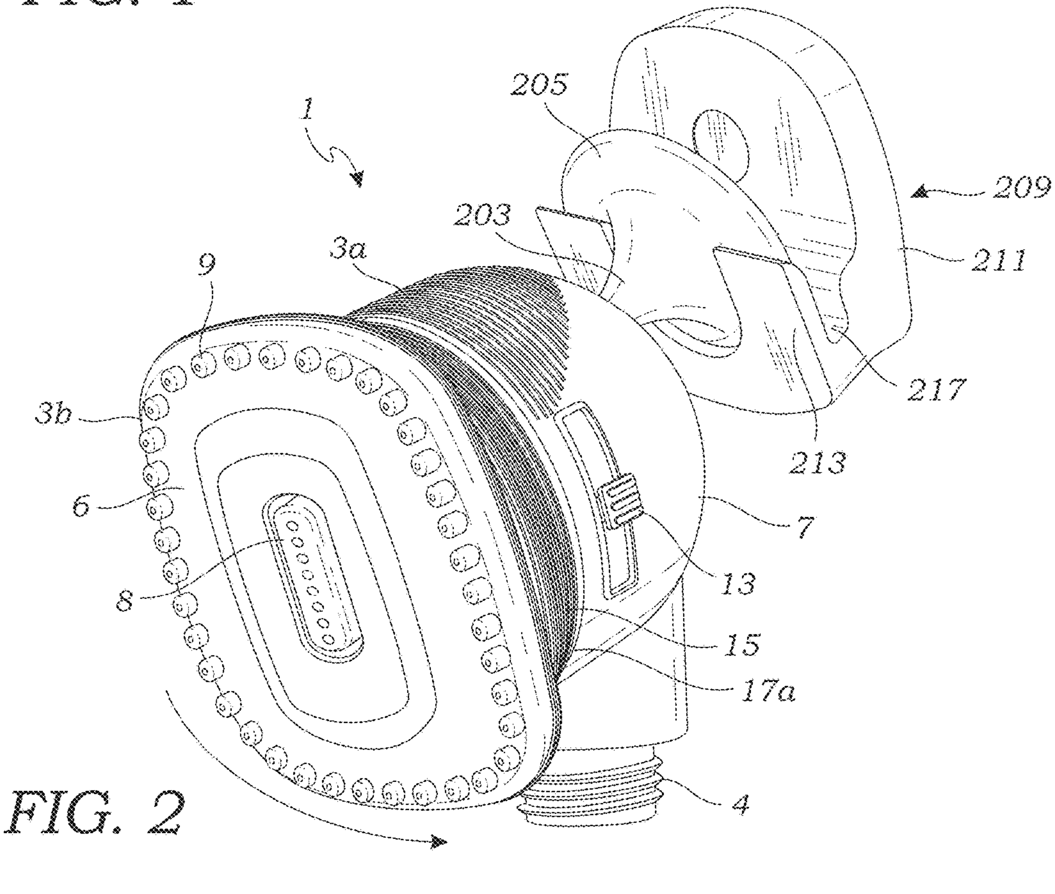
FIG. 2 is a left perspective view of the handheld showerhead assembly illustrated in FIG. 1 wherein the showerhead is engaged with a surface mount.
Figure 3:
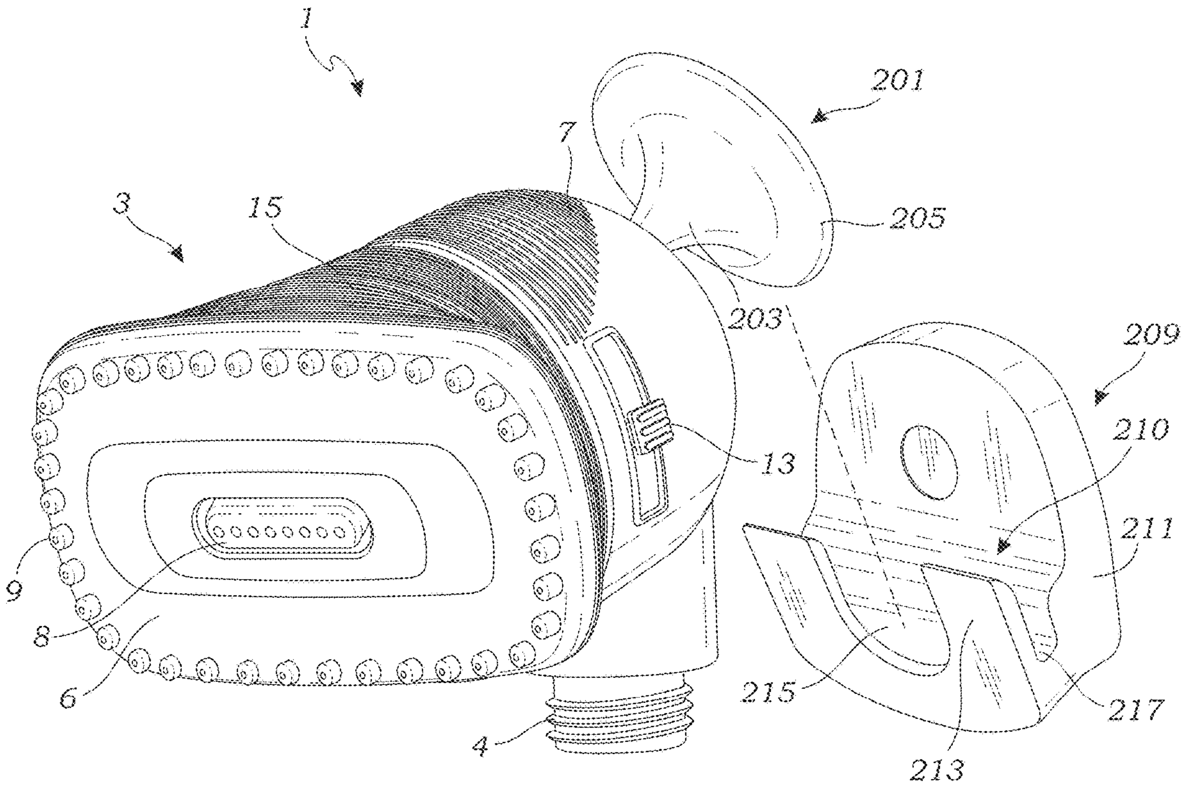
FIG. 3 is a left perspective view of the showerhead assembly illustrated in FIG. 1 wherein the showerhead is disengaged from a surface mount and the showerhead's primary nozzles are horizontally oriented.
Figure 4:
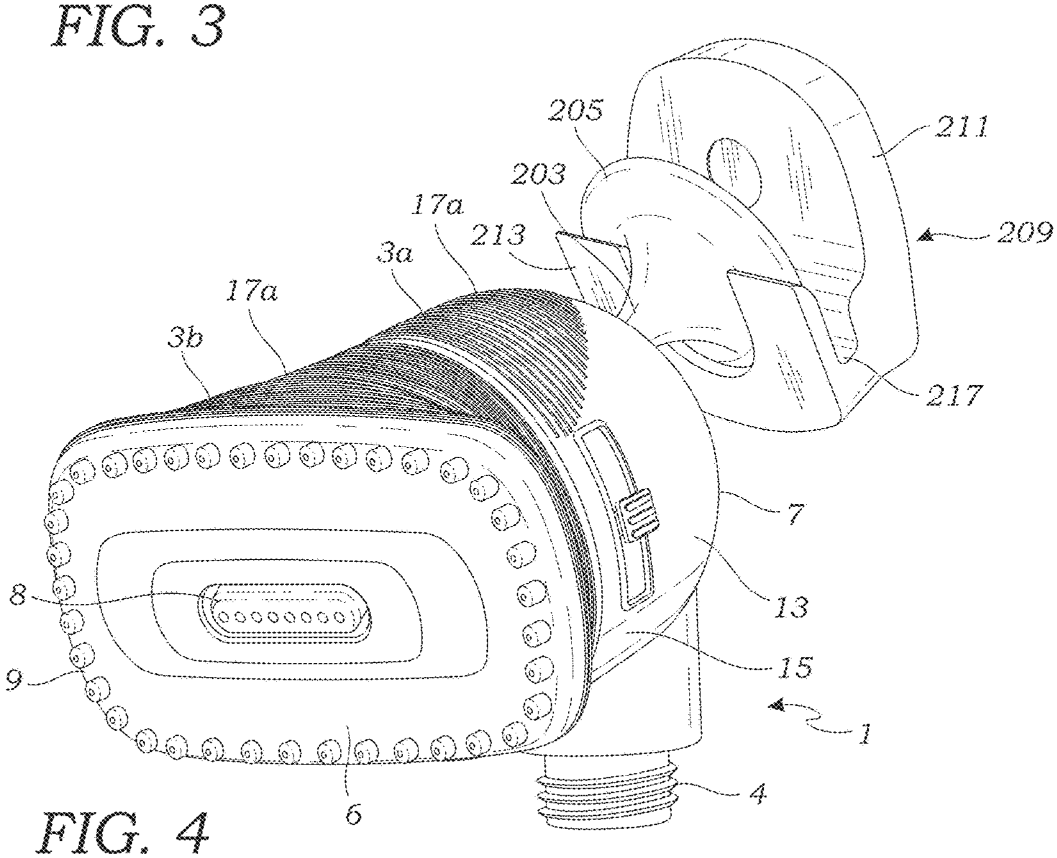
FIG. 4 is a left perspective view on the showerhead assembly illustrated in FIG. 3 wherein the showerhead is engaged to a surface mount.
Figure 5:
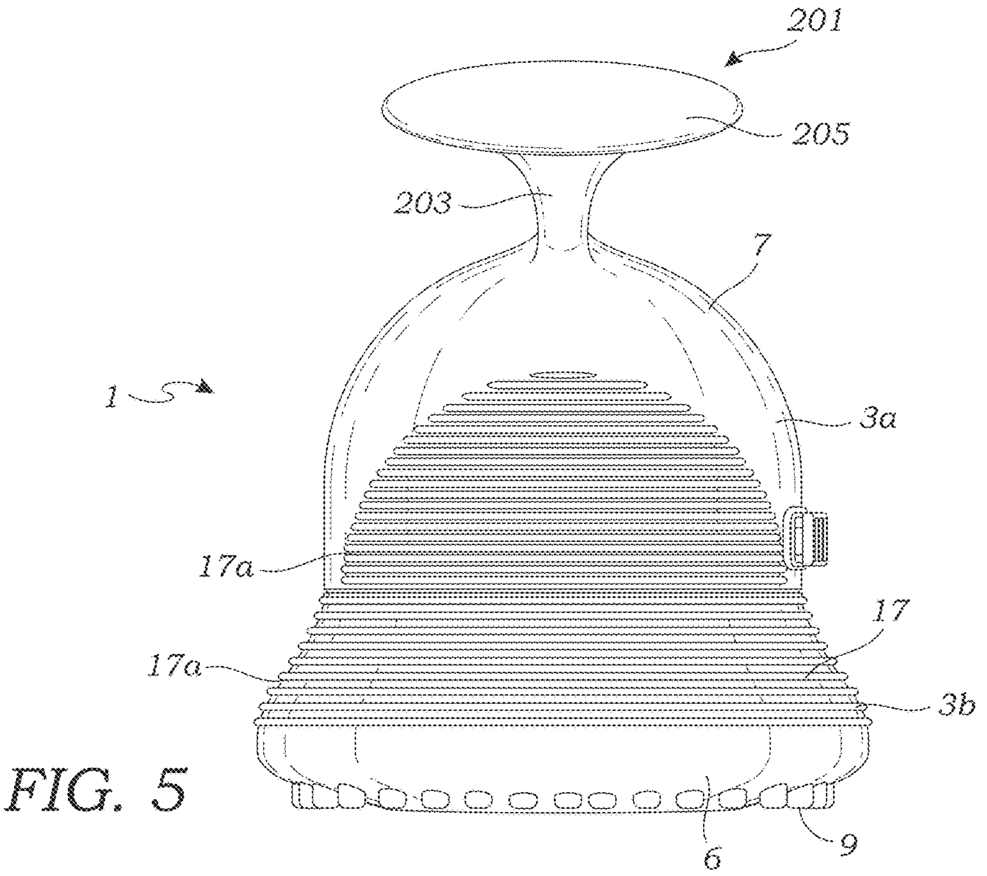
FIG. 5 is a top plan view of the showerhead assembly shown in FIG. 3.

Preferably the non-rotatable section 3*b* has both hollow primary nozzles 8 and hollow supplemental nozzles 9. Also preferably, either or both of the primary nozzles 8 and supplemental nozzles 9 are arranged to not have a circular pattern so that when the rotatable section is rotated, the showerhead produces different spray patterns. For example, FIGS. 1-4 illustrate a showerhead including primary nozzles 8 arranged in a line and supplemental nozzles 9 arranged in an oval. FIG. 1 illustrates how the hollow nozzles are arranged to provide a primarily vertical oriented pattern, but that the rotation of the rotatable section 3*b* causes the showerhead to produce a spray pattern in a primarily horizontal pattern, as shown in FIGS. 3 and 4. Other preferred noncircular nozzle patterns include triangular and rectangular, or combinations thereof. For reasons explained further below, a square nozzle pattern would not be preferred as rotations of 90 degrees would not provide varied spray patterns.

Figure 6:
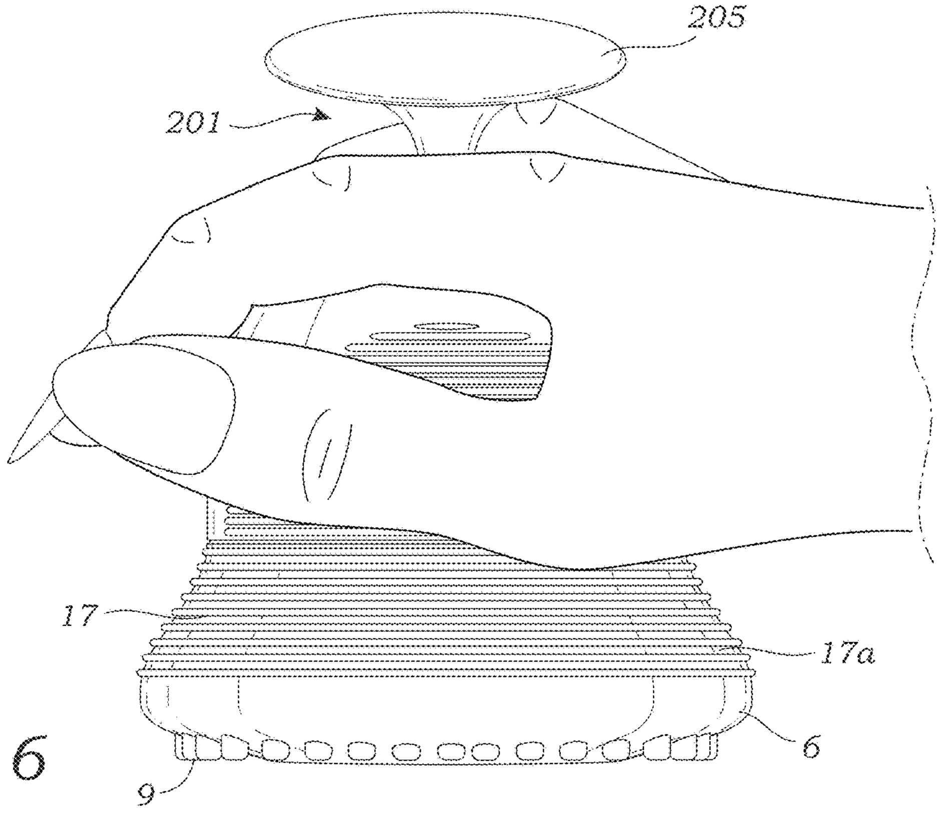
FIG. 6 is a top plan view of the showerhead assembly shown in FIG. 5 wherein the showerhead assembly is held by a person's hand.
Figure 7:
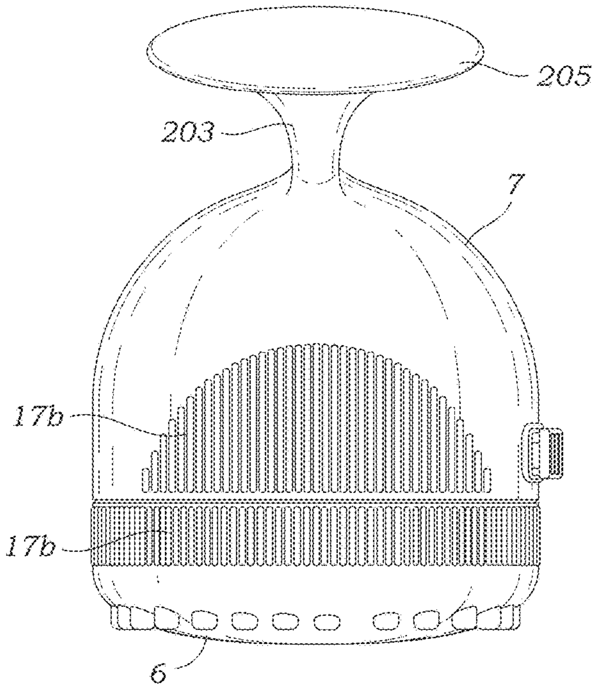
FIG. 7 is a top plan view of the showerhead assembly shown in FIG. 1 wherein the gripping surfaces on the rotating and non-rotating sections have been modified to include longitudinally extending ridges.
Figure 8:
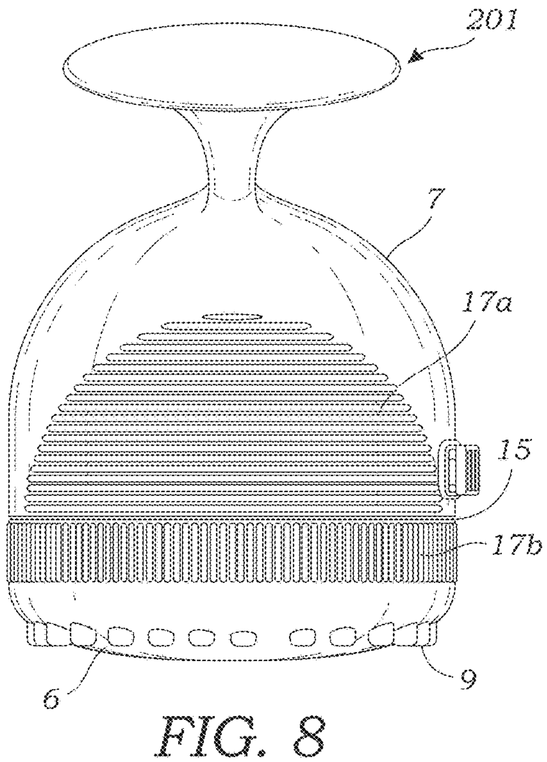
FIG. 8 is a top plan view of the showerhead assembly shown in FIG. 1 wherein the gripping surface on the non-rotating section includes circumferentially extending ridges and the gripping surface on the rotating section includes longitudinally extending ridges.
Figure 9:
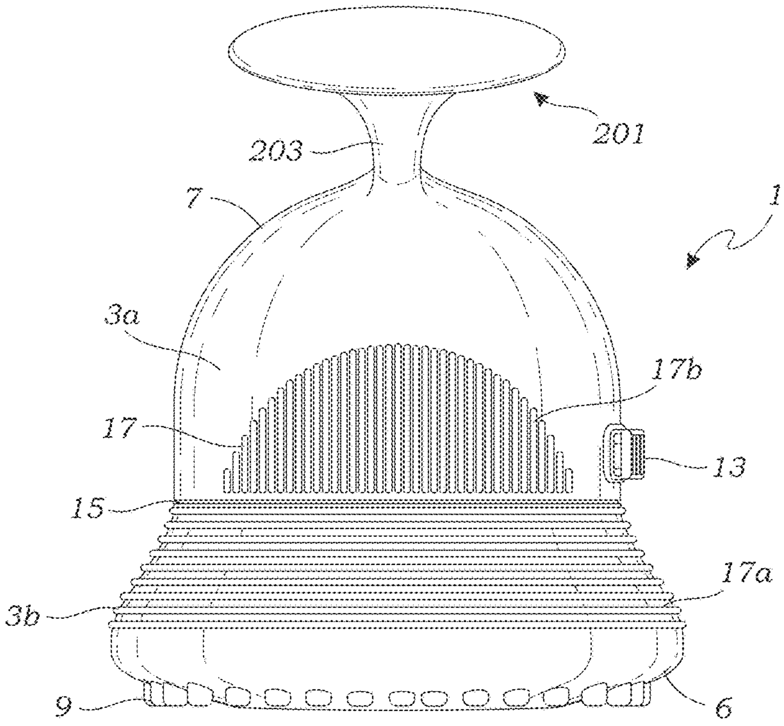
FIG. 9 is a top plan view of the showerhead assembly shown in FIG. 1 wherein the gripping surface on the non-rotating section includes longitudinally extending ridges and the gripping surface on the rotating section includes circumferentially extending ridges, and the rotating section has been rotated 90°.

As illustrated in FIGS. 1-9, preferably both the non-rotatable section 3*a* and rotatable section 3*b* include ridges 17. Preferably, the ridges 17 circumnavigate the rotatable section 3*b*, and preferably the ridges at least partially circumnavigate the non-rotatable section 3*a*. The ridges may be aligned circumferentially 17*a*, as illustrated in FIGS. 1-6. Alternatively, the ridges may be aligned longitudinally 17*b* as illustrated in FIG. 7. Alternatively, the showerhead assembly may include a combination of circumferential ridges 17*a* and longitudinal ridges 17*b* as illustrated in FIGS. 8 and 9. In a preferred embodiment shown in FIG. 8, the non-rotatable section includes circumferentially extending ridges which are ideal for a person holding the showerhead during bathing, such as illustrated in FIG. 6. However, the preferred showerhead shown in FIG. 8, includes a rotatable section 3*b* which includes longitudinal extending ridges 17*b* which are ideal for gripping the rotating section during its rotation. FIG. 9 illustrates a combination of both of these benefits by the non-rotatable section including circumferentially extending ridges which are ideal for a person holding the showerhead during bathing, and the rotatable section 3*b* including longitudinal extending ridges 17*b* which are ideal for gripping the rotating section during its rotation.

As illustrated in FIGS. 1-15, and 63-64, and in particular as illustrated in FIG. 6, the showerhead 3 is shaped to be held by a person's hand. To this end, the showerhead assembly 1 includes a mushroom shaped finger lock 201 which extends rearwardly from the showerhead's backside 7. The finger lock's mushroom shape is accomplished by the finger lock 201 including a narrow shaft 203 and a radially extending flange 205. Preferably the shaft is sufficiently narrow that it can slide between a person's fingers, as illustrated in FIG. 6. Moreover, the radially extending flange 205 is spaced apart from the showerhead's backside 7 sufficient to allow a person's fingers to slide between the radially extending flange and showerhead's backside. Preferably, this spacing is sufficiently small so that the flange 205 can place positive pressure against one's fingers to help a bather maintain their grip on the showerhead 3.

Figure 10:
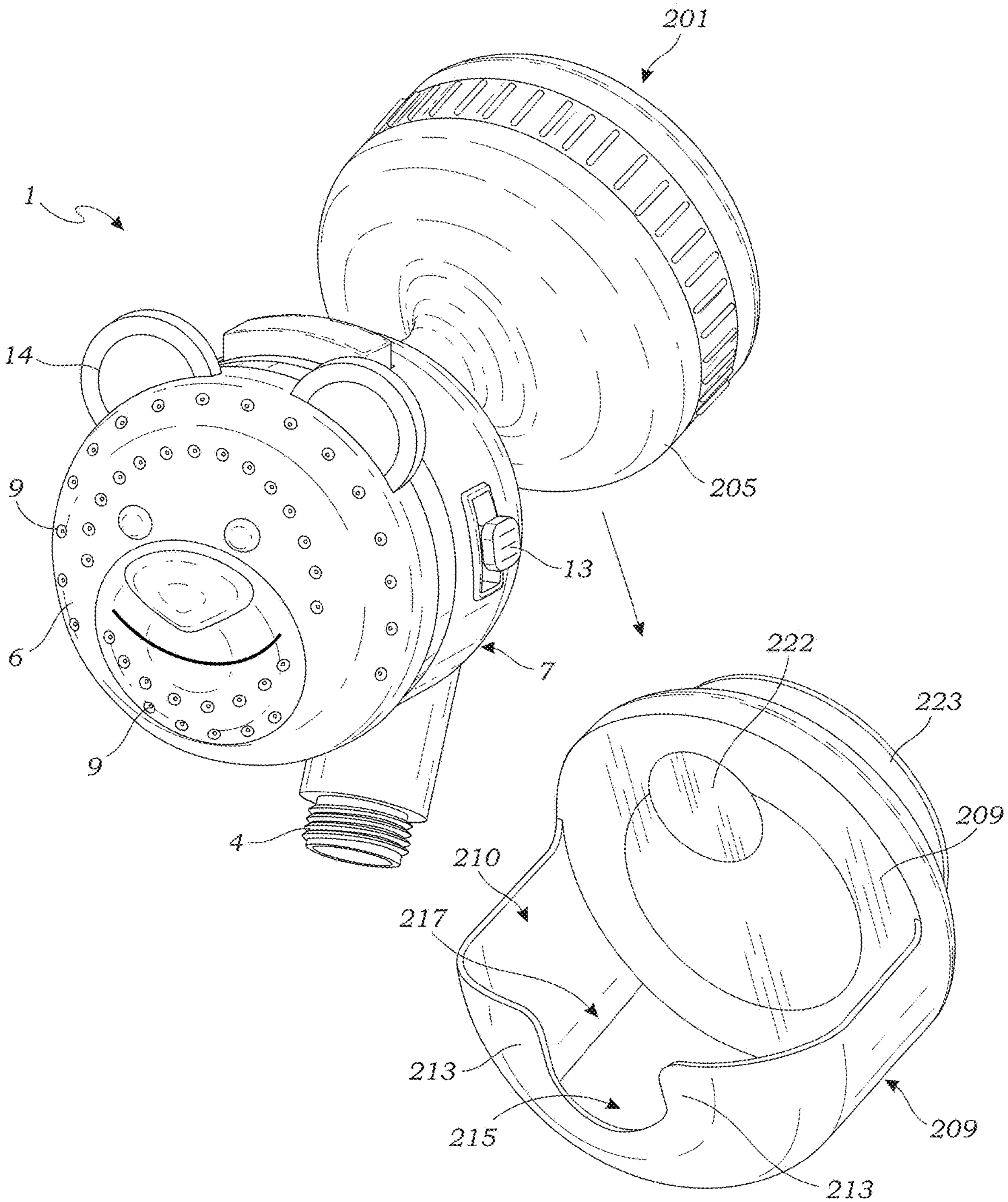
FIG. 10 is a left perspective view of an additional embodiment of a handheld showerhead assembly including a mushroom shaped finger lock wherein the mushroom shaped finger lock is enlarged and hollow to function as a receptacle for receiving shampoo or soap, and wherein the showerhead is disengaged from a surface mount.
Figure 11:
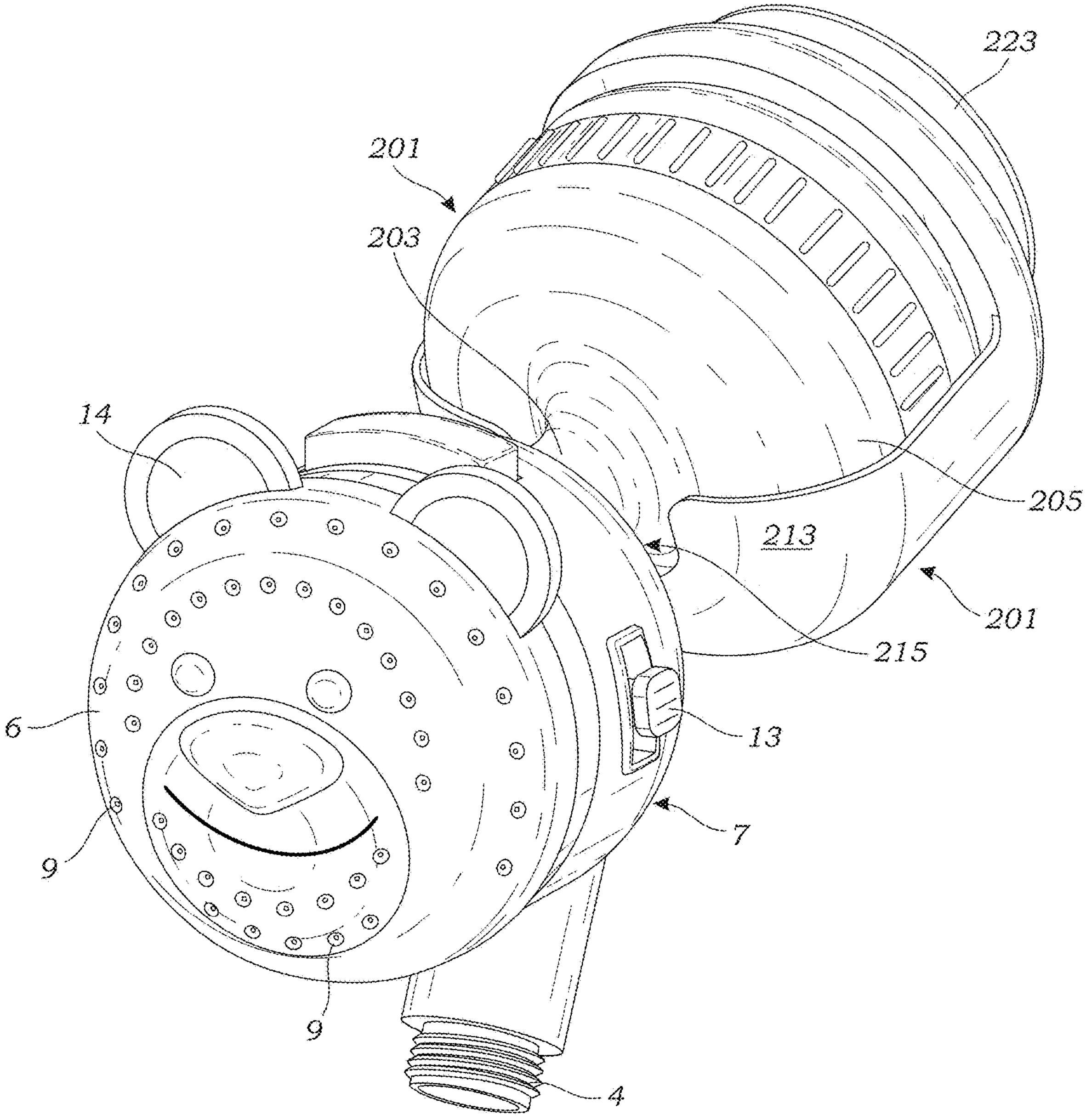
FIG. 11 is a left perspective view of the handheld showerhead assembly illustrated in FIG. 10 wherein the showerhead is engaged with a surface mount.
Figure 12:
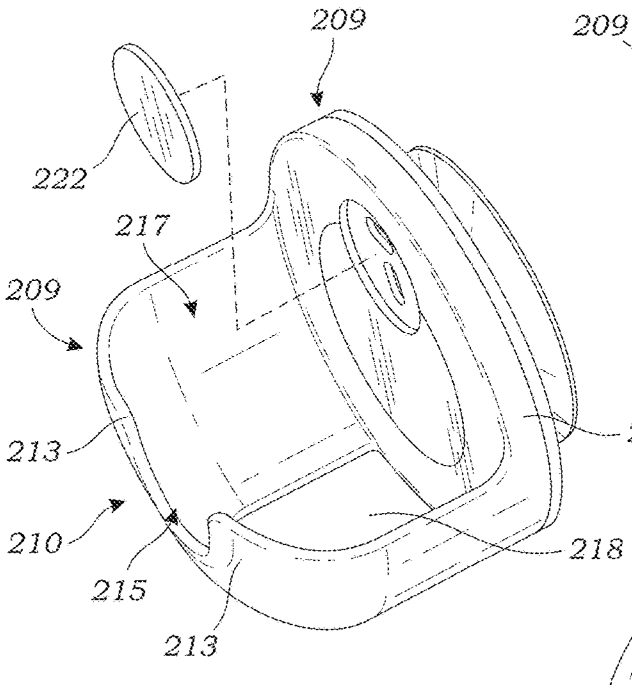
FIG. 12 is a left front perspective view of a surface mount for use with the showerhead assembly shown in FIGS. 10 and 11.
Figure 13:
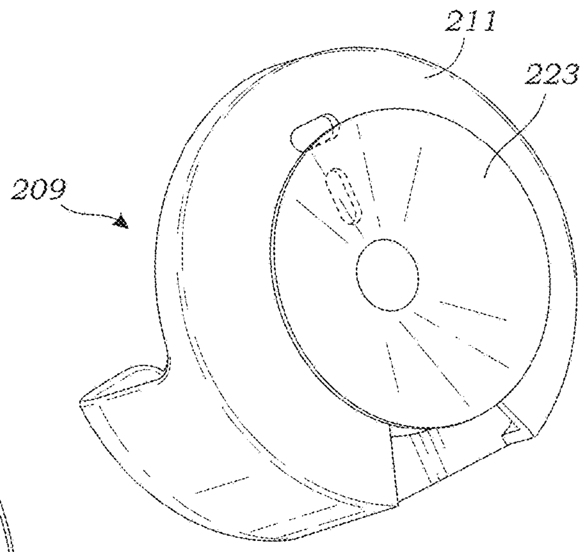
FIG. 13 is a left rear perspective view of a surface mount for use with the showerhead assembly shown in FIGS. 10 and 11.
Figure 14:
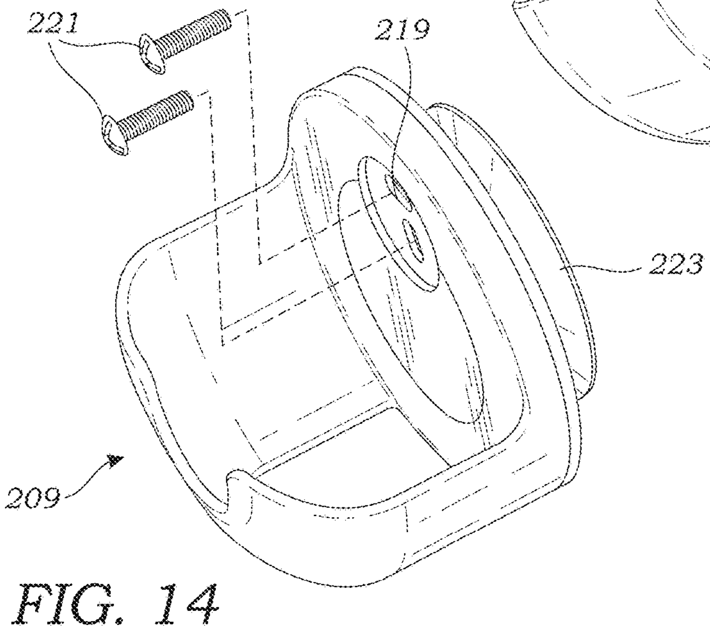
FIG. 14 is a left perspective view of a surface mount for use with the showerhead assembly shown in FIGS. 10 and 11 illustrating how the showerhead assembly may include threaded fasteners.
Figure 15:
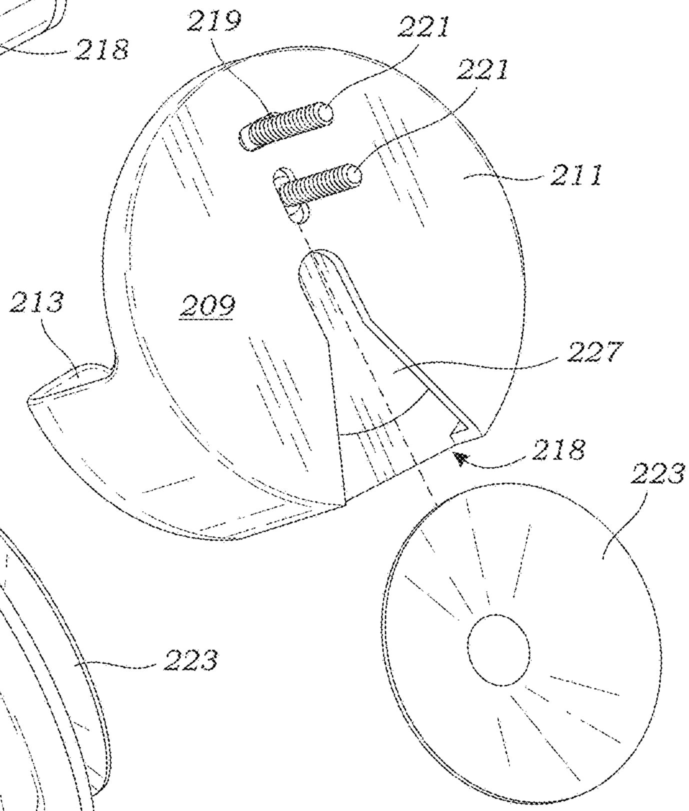
FIG. 15 is a left rear perspective view of a surface mount shown in FIG. 14.

In a preferred embodiment illustrated in FIG. 10, the mushroom shaped finger lock 201 in enlarged and includes a hollow cavity. The cavity is intended for storing a shampoo or soap which can trickle into the flow of water through the showerhead. This embodiment may include a controller switch 13 for selectively allowing or blocking the flow of shampoo or soap into the showerhead's fluid pathways. In addition, as illustrated in FIG. 10, the showerhead may be constructed to include fanciful features such as a face or ears 14.

Preferably, and as illustrated in FIGS. 1-4, 10-15 and FIGS. 63-64, the showerhead assembly 1 includes a surface mount 209 shaped to hold and capture the showerhead assembly's finger lock 201. The surface mount 209 includes a back plate 211 and a pair of teeth 213, wherein the teeth and backplate are spaced apart and are substantially parallel to each other to form a trough 217. The two teeth 213 are spaced apart from one another to form a center recess 215 which is sized to accept the finger lock's shaft 213. However, the center recess 215 is not so large as to allow the finger lock's flange 205 to pass through. Preferably, the surface mount includes some sort of fastener for attaching the surface mount's back plate to a surface, such as shower wall, such as by a suction cup 223 shown in FIGS. 12-15, or threaded fasteners 221 shown in FIGS. 14-15, or an adhesive (not shown).

The showerhead assembly 1 may include a side controller 13 (shown in FIGS. 1-5) which can selectively turn on and off the flow of water from the primary nozzles 8 and/or the supplemental nozzles 9, or to selectively allow the flow of shampoo or soap into the showerhead conduits as shown in FIG. 10. Alternatively, as illustrated in FIGS. 1-11, 16-19, 37-38, 43-44, and 49-63, preferably the selection and control of water to the primary nozzles 8 and supplemental nozzles 9 can be controlled by rotation of the showerhead's rotatable section 3*b* relative to its non-rotatable section 3*a*.

For example, in an embodiment illustrated in 16A-16B, the non-rotatable section includes a single outlet 18, and the rotatable section includes two inlets 19*a* and 19*b*. The two inlets 19*a* and 19*b* are connected by a single conduit 11 which are, in turn, connected to the primary nozzles 8. For this simple embodiment, the inlets 19*a* and 19*b* are located on opposing sides of the showerhead face, in other words 180° from each other, such that rotation of the rotatable section 180° relative to non-rotatable 3*a* causes inlets 19*a* and 19*b* to alternatively align with inlet 18 so that nozzles 8 can expel water with the showerhead face rotated into two different alignments.

Figure 16A:
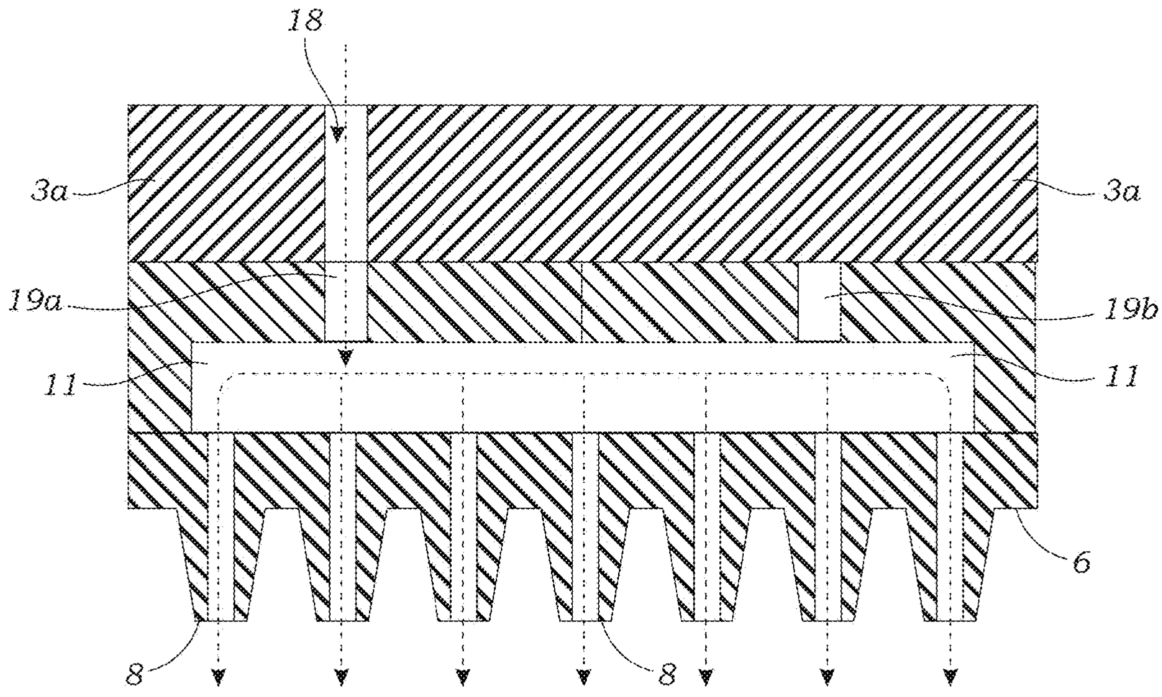
FIG. 16A is a side cut-away view illustrating a showerhead embodiment including a non-rotatable section and a rotatable section.
Figure 16B:
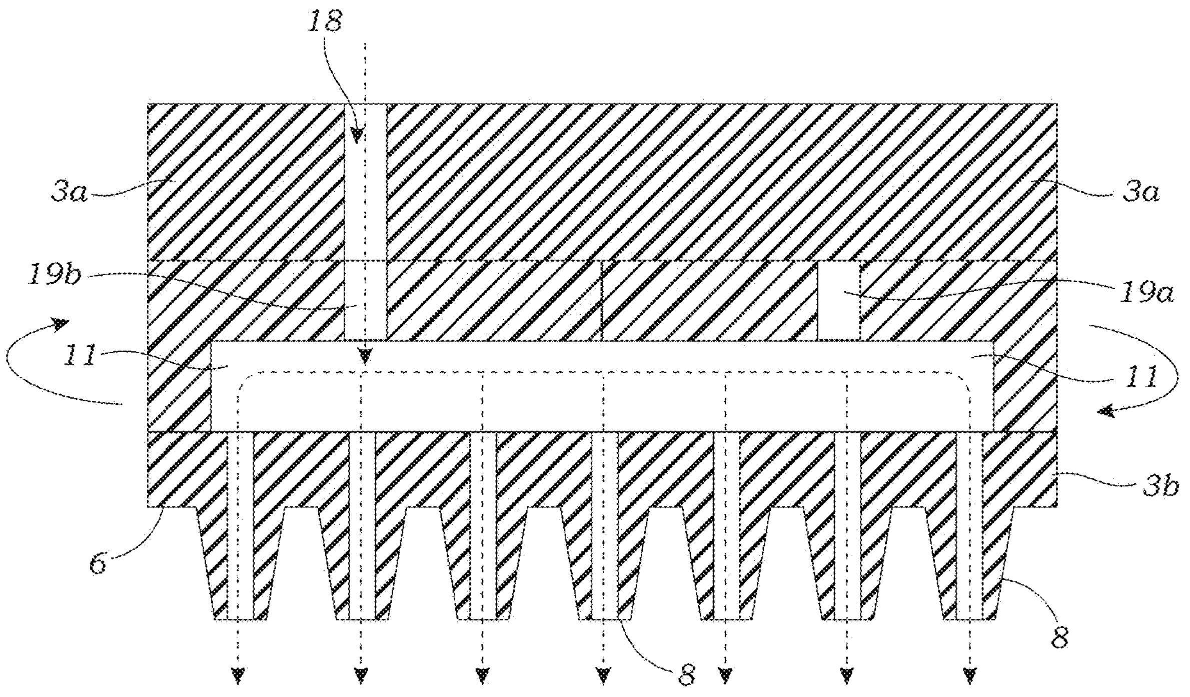
FIG. 16B is a side cut-away view illustrating the showerhead embodiment in FIG. 16B wherein the rotatable section has been rotated 180°.

In an alternative embodiment illustrated in FIGS. 17A-20B, sequential 90° rotations of the rotatable section 3*b* relative to the non-rotatable section 3*a* causes water to flow through different conduits to reach different showerhead nozzles. To this end, in a first embodiment illustrated in FIGS. 16A-19B, the non-rotatable section 3*a* includes a faceplate 16 and a water source in the form of a single outlet 18. Meanwhile, for this embodiment, the rotatable section 3*b* includes four inlets 19*a*-19*d* located 90° from each other about the rotatable section's axis of rotation. With reference also to FIG. 16, inlets 19*a* and 19*b* supply water to a first conduit (not shown) supplying primary nozzles 8. Conversely, inlets 19*c* and 19*d* supply water to a second single conduit (not shown) that supplies the supplemental nozzles 9.

Figure 17A:
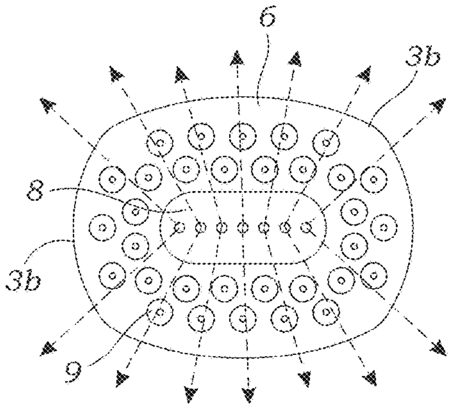
FIG. 17A is a front view of the face of a showerhead assembly including a non-rotatable section and a rotatable section wherein the primary nozzles are spraying horizontally.
Figure 17B:
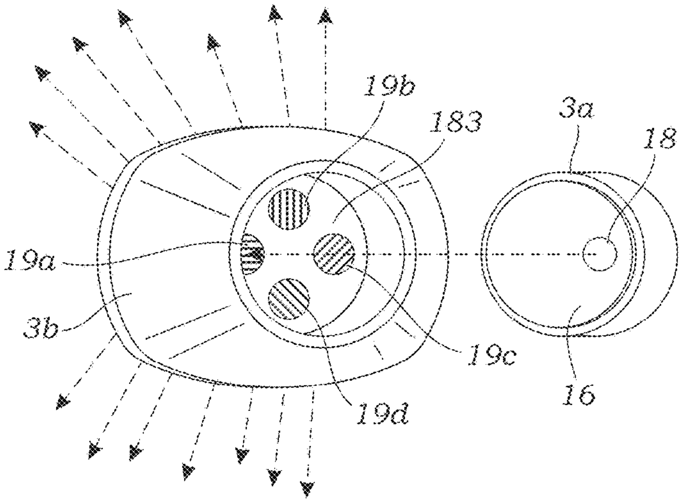
FIG. 17B is a rear exploded perspective view of the showerhead shown in FIG. 17A.
Figure 18A:
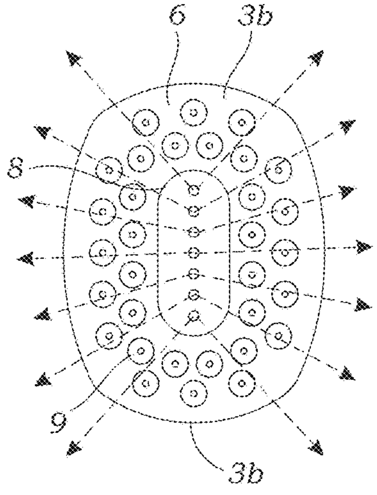
FIG. 18A is a front view of the face of a showerhead assembly shown in FIG. 17A wherein the rotatable section has been rotated 90° so that the primary nozzles are spraying vertically.
Figure 18B:
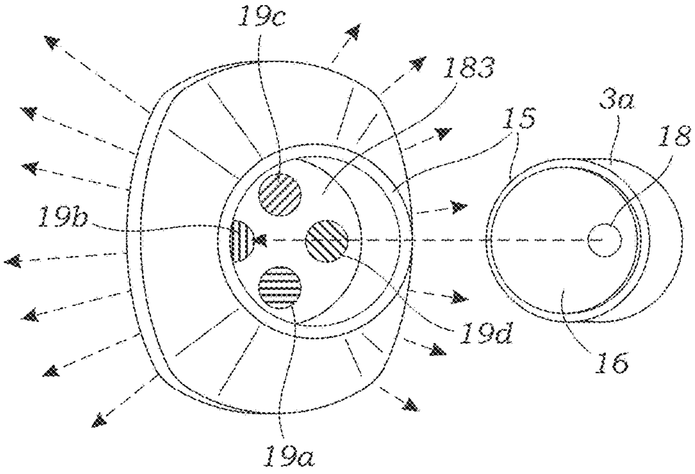
FIG. 18B is a rear exploded perspective view of the showerhead shown in FIG. 18A.
Figure 19A:
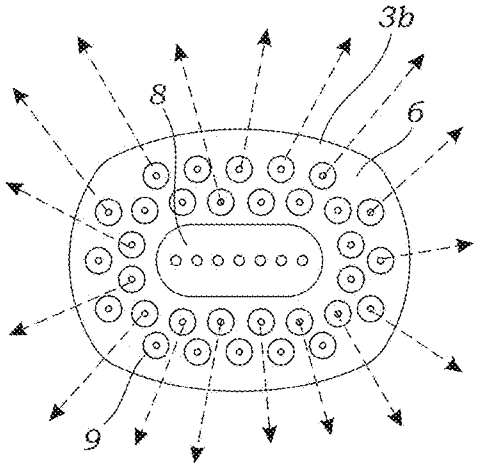
FIG. 19A is a front view of the face of the showerhead assembly shown in FIG. 17A wherein the rotatable section has been rotated an additional 90° so the supplemental nozzles are spraying horizontally.
Figure 19B:
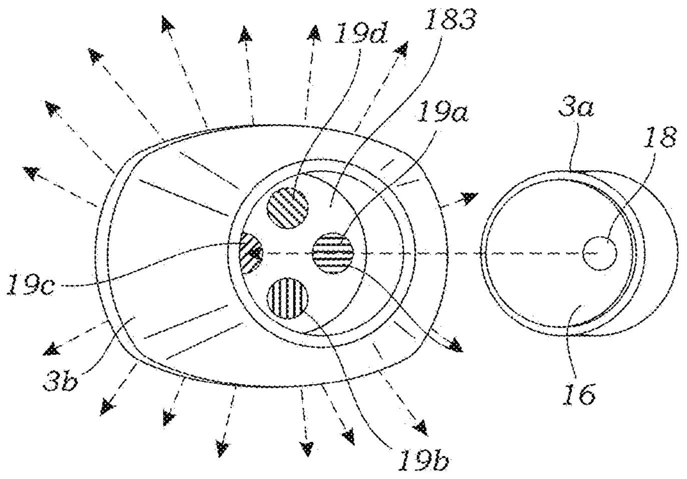
FIG. 19B is a rear exploded perspective view of the showerhead shown in FIG. 19A.
Figure 20A:
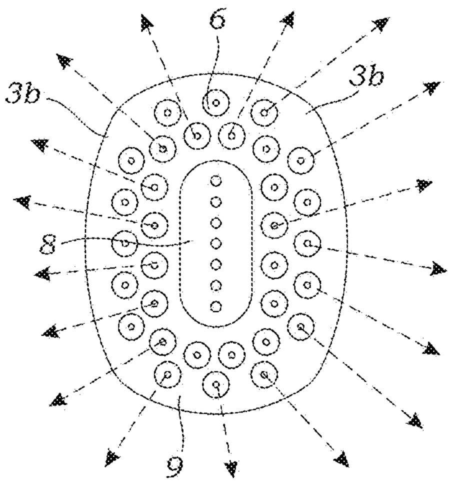
FIG. 20A is a front view of the face of the showerhead assembly shown in FIG. 17A wherein the rotatable section has been rotated an additional 90° so that the supplemental nozzles are spraying vertically.
Figure 20B:
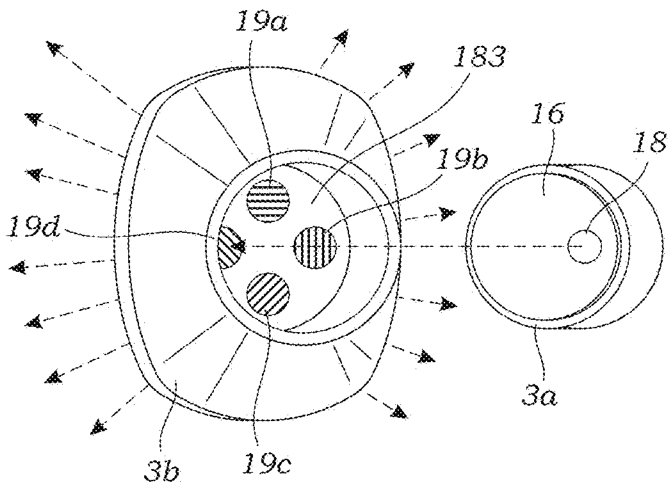
FIG. 20B is a rear exploded perspective view of the showerhead shown in FIG. 20A.

Rotation of the rotatable section 3*b* in 90° increments causes the non-rotatable section's single outlet 18 to align with one of the four rotatable section inlets 19*a*-19*d*. For example, FIGS. 17A and 17B illustrate the rotatable section 3*b* aligned to a first inlet 19*a*. Meanwhile, inlet 19*a* is connected by conduits (not shown) to the primary nozzles 8 so that the showerhead emits water from the primary nozzles 8 with the showerhead aligned in a horizontal pattern. FIGS. 18A and 18B illustrate the nozzle having been rotated 90 degrees so that the rotatable section's inlet 19*b* aligns with the non-rotatable section's water outlet 18 so as to allow water to flow to the primary nozzles which are now aligned in a vertical configuration. FIGS. 19A and 19 illustrate the rotatable section 3*b* having been rotated an additional 90 degrees so that its inlet 19*c* now aligns with the non-rotatable section's water source outlet 18. Meanwhile, inlet 19*c* is connected by conduits (not shown) to the supplemental nozzles 9 so that the showerhead emits water from the supplemental nozzles to produce a substantially horizontal spray pattern. Finally, FIGS. 20A and 20B illustrate the showerhead nozzle having been rotated a third time 90 degrees so that inlet 19*d* aligns with the non-rotatable section's water outlet 18 so as to send water to the supplemental nozzles 9 which are now aligned in a vertical spray pattern. For each of these rotations, the non-rotatable section's faceplate 16 covers and blocks the passage of water to three of the four inlets so that water only sprays from either the primary nozzles or supplemental nozzles in either a horizontal or vertical orientation.

Figure 39:
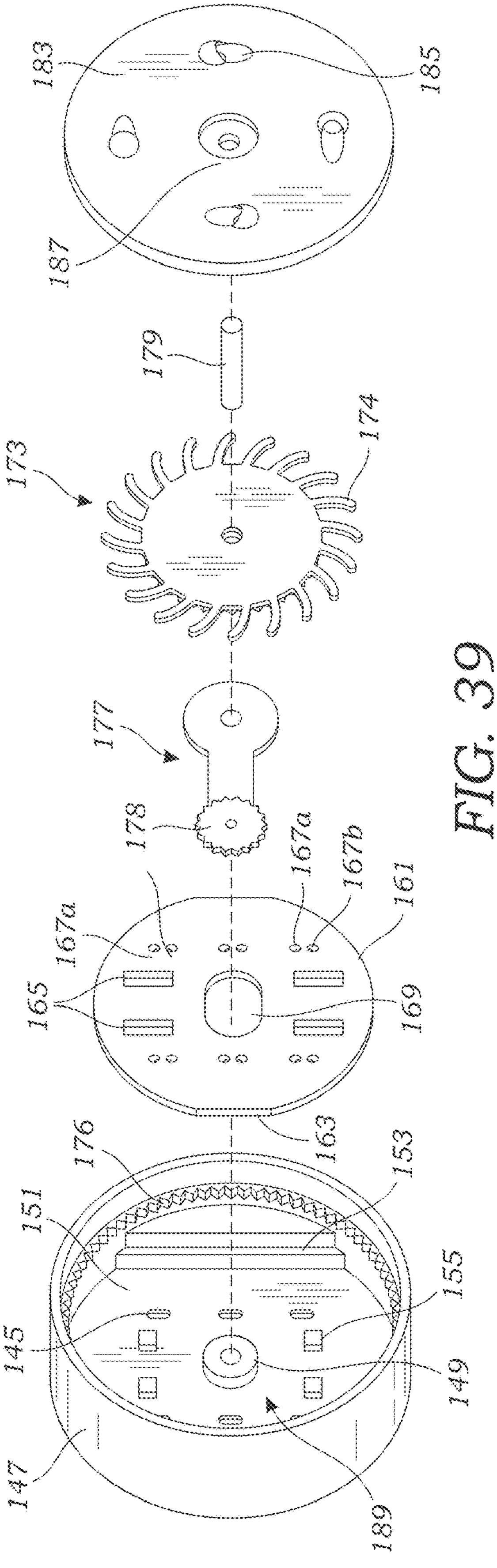
FIG. 39 is an exploded rear perspective view of the oscillating nozzle assembly illustrated in FIG. 38.
Figure 40A:
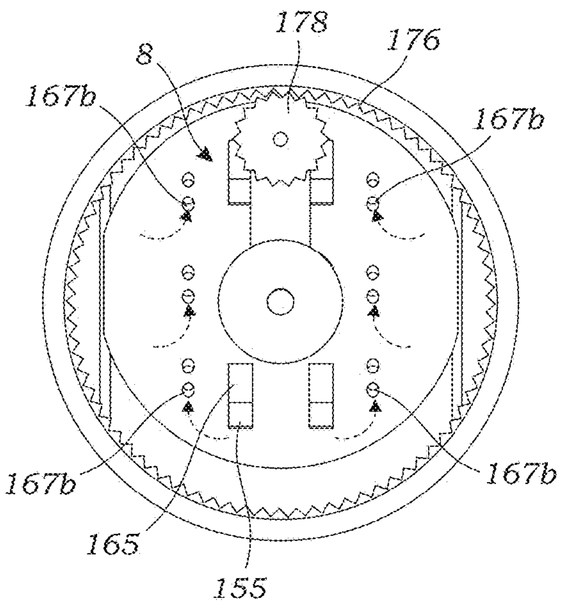
FIG. 40A is a rear view illustrating the planetary gear assembly of the oscillating nozzle assembly of FIGS. 38-39.
Figure 40B:
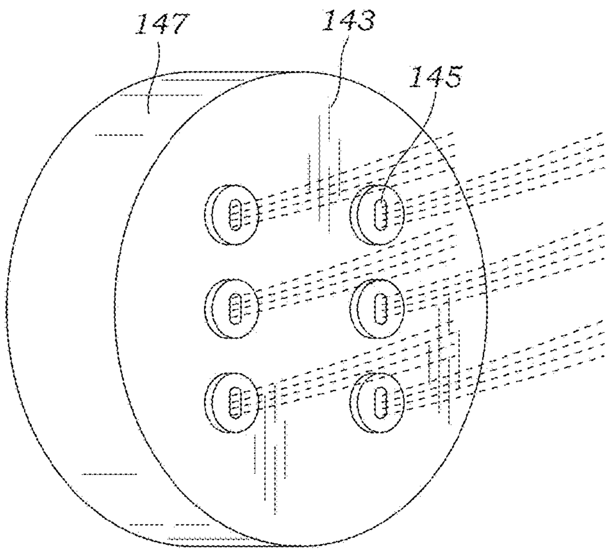
FIG. 40B is a front perspective view of the oscillating nozzle assembly shown in FIG. 40A wherein the nozzles are spraying upwardly.
Figure 41A:
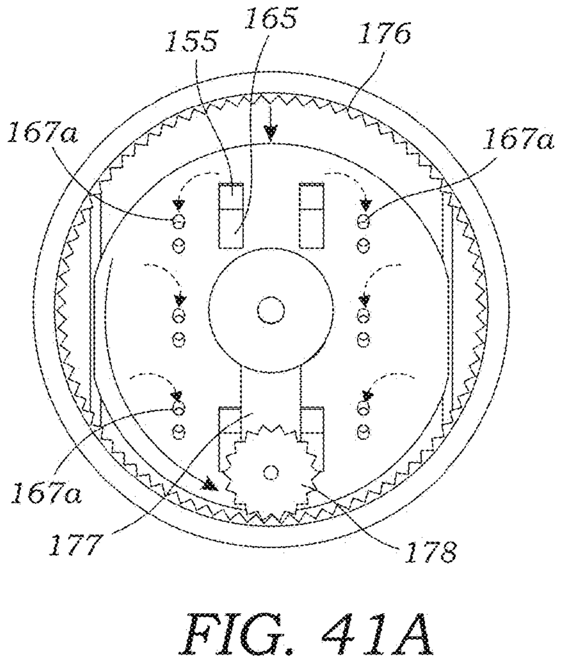
FIG. 41A is a rear view of the oscillating nozzle assembly shown in 40A wherein the gears have rotated to cause the nozzles to spray downwardly.
Figure 41B:
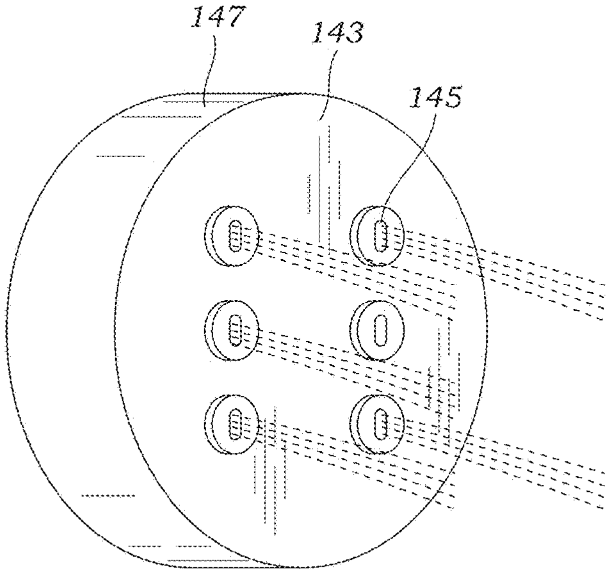
FIG. 41B is a front perspective view of the oscillating nozzle assembly shown in FIG. 41A wherein the nozzles are spraying downwardly.
Figure 42:
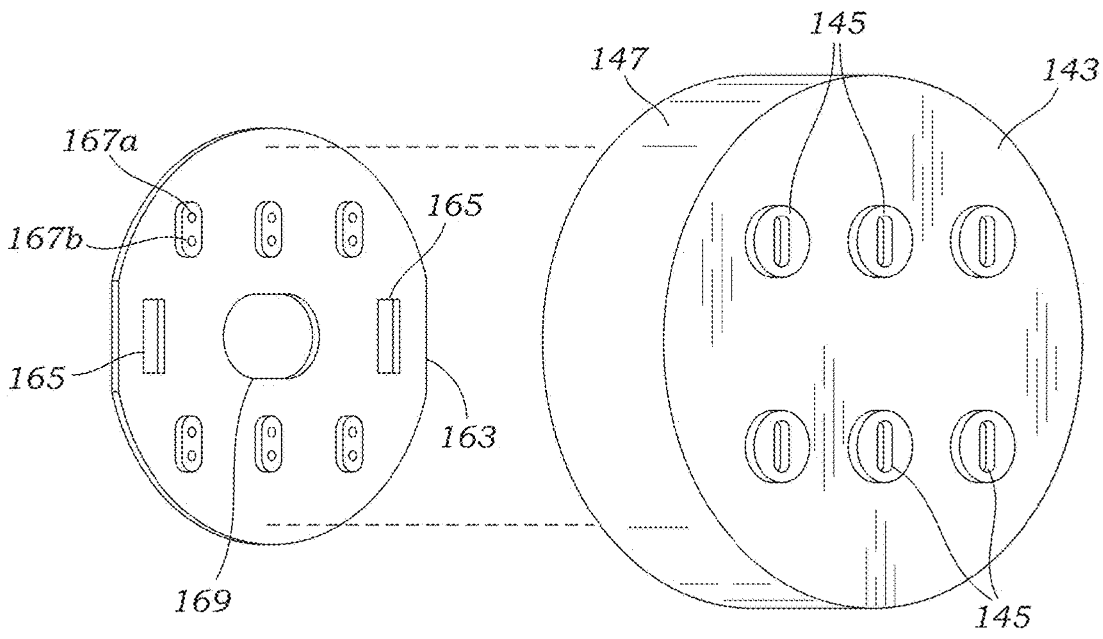
FIG. 42 is an exploded front perspective view illustrating an obstructor plate and water sources for use in supplying water to the oscillating nozzle assembly shown in FIGS. 38-41.
Figure 43:
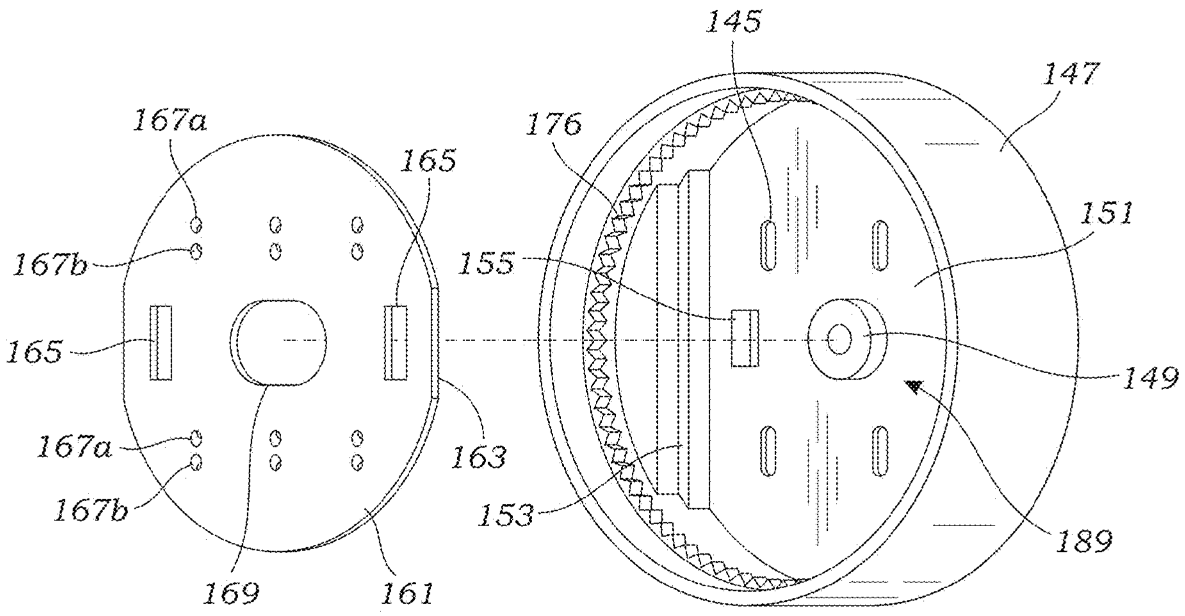
FIG. 43 is an exploded rear perspective view illustrating an obstructor plate and water sources for use in supplying water to the oscillating nozzle assembly shown in FIG. 42.
Figure 44A:
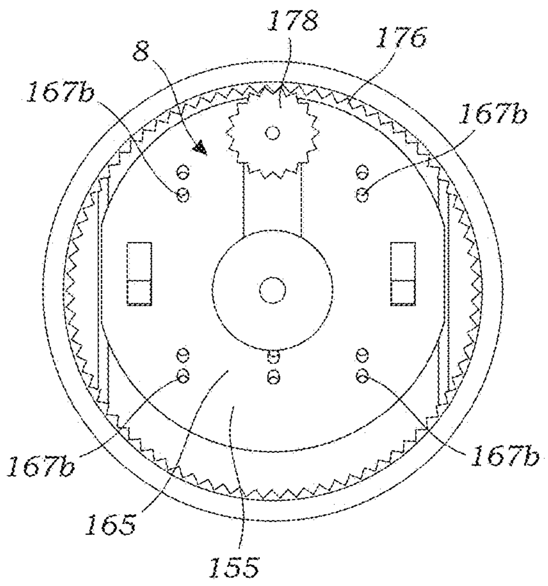
FIG. 44A is a rear view illustrating the planetary gear assembly of an alternative oscillating nozzle assembly including six oscillating nozzles.
Figure 44B:
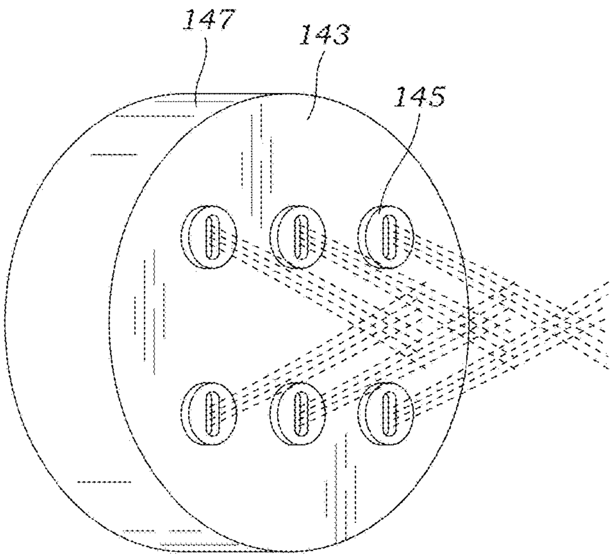
FIG. 44B is a front perspective view of an alternative oscillating nozzle assembly shown in FIG. 44A including six oscillating nozzles which spray inwardly wherein a top row of three nozzles are spraying upwardly and a bottom row of three nozzles are downwardly.
Figure 45A:
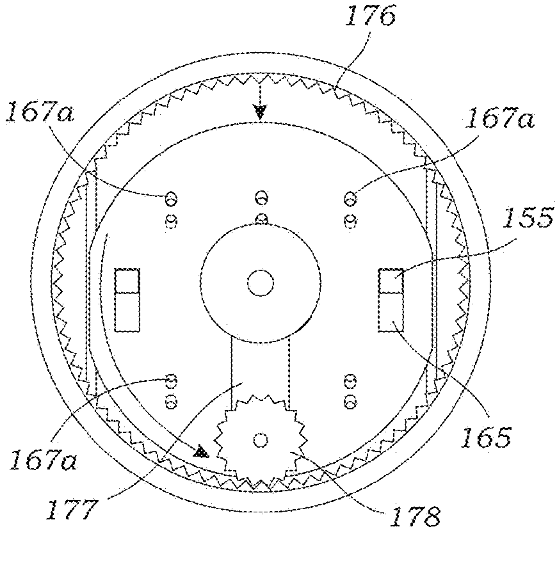
FIG. 45A is a rear view illustrating the planetary gear assembly of an alternative oscillating nozzle assembly shown in FIG. 44A wherein the gears have rotated to cause the nozzles to spray in opposite directions.
Figure 45B:
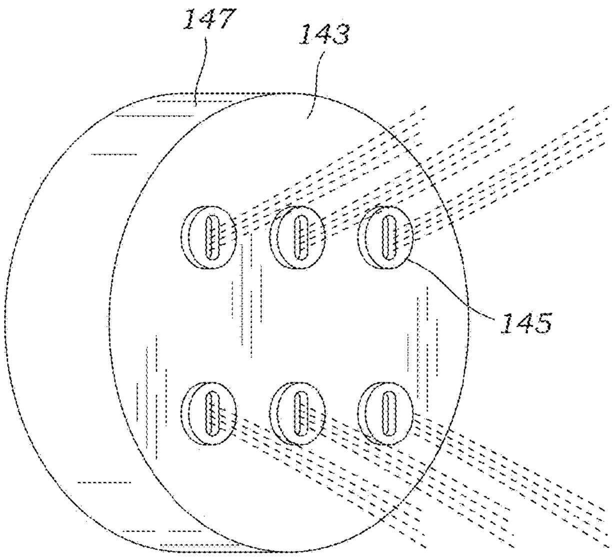
FIG. 45B is a front perspective view of the alternative oscillating nozzle assembly shown in FIG. 44A wherein the top row of three nozzles are spraying downwardly and a bottom row of three nozzles are upwardly.
Figure 46:
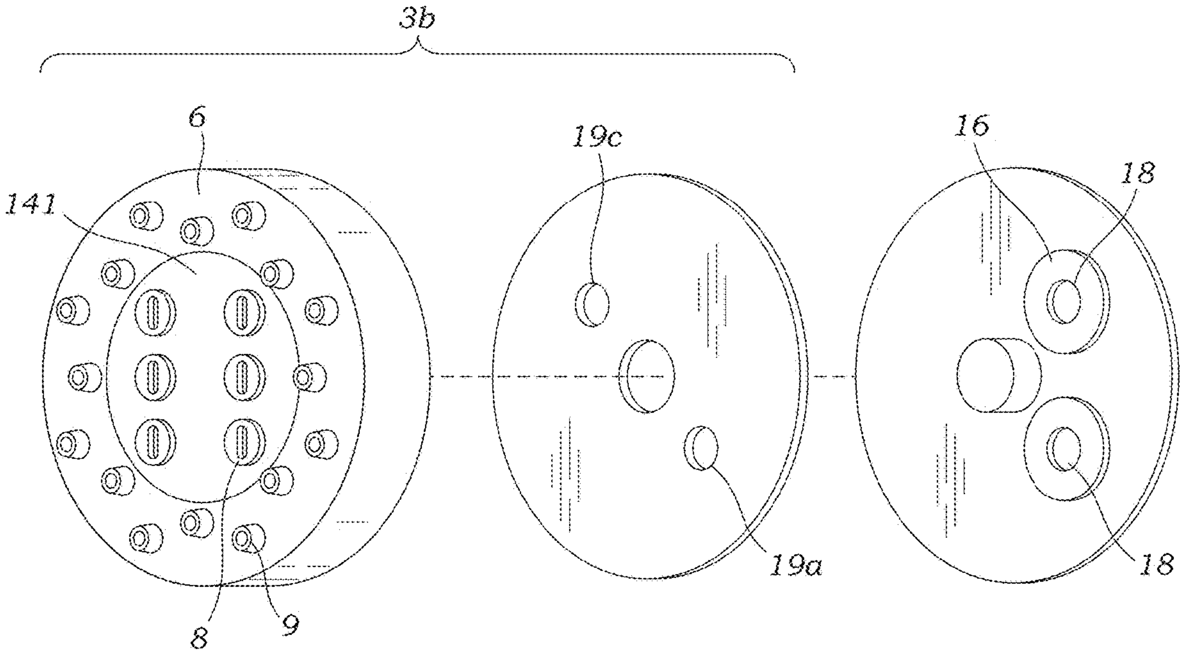
FIG. 46 is an exploded front perspective view of an alternative embodiment of a showerhead assembly including its rotatable section and a front view of the non-rotatable section's two outlets as they align (or don't align) with the rotatable section's inlets 19*a* and 19*c*, in a first orientation.
Figure 47:
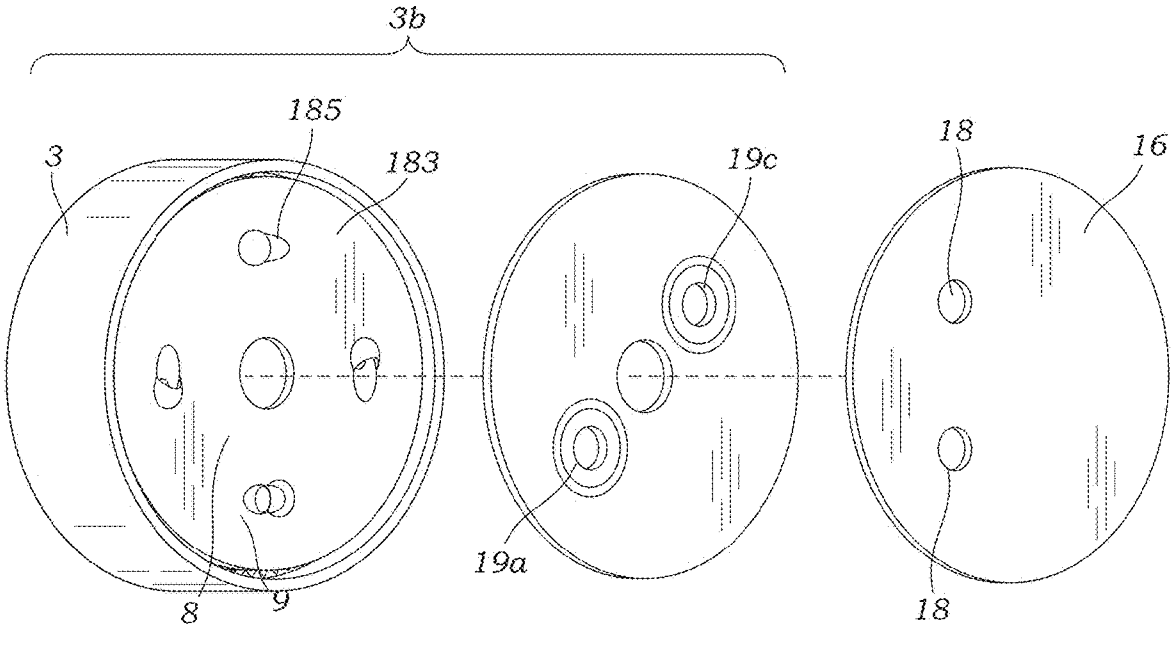
FIG. 47 is an exploded rear perspective view of the alternative embodiment of the showerhead assembly shown in FIG. 46 including its rotatable section and a rear view of the non-rotatable section's two outlets as they align (or don't align) with the rotatable section's inlets 19*a* and 19*c*, in a first orientation.
Figure 48:
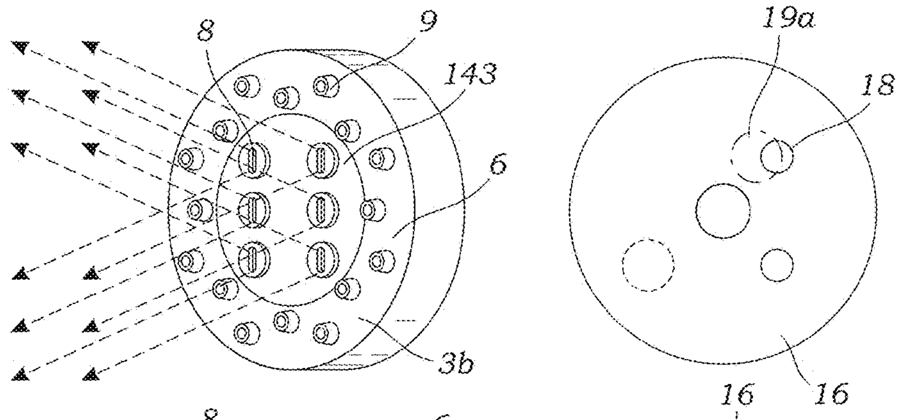
FIG. 48 is a front perspective view of the showerhead's rotatable section and a front view depicting the non-rotatable section's two outlets as the align (or don't align) with the rotatable section's inlets 19*a* and 19*c;*
Figure 49:
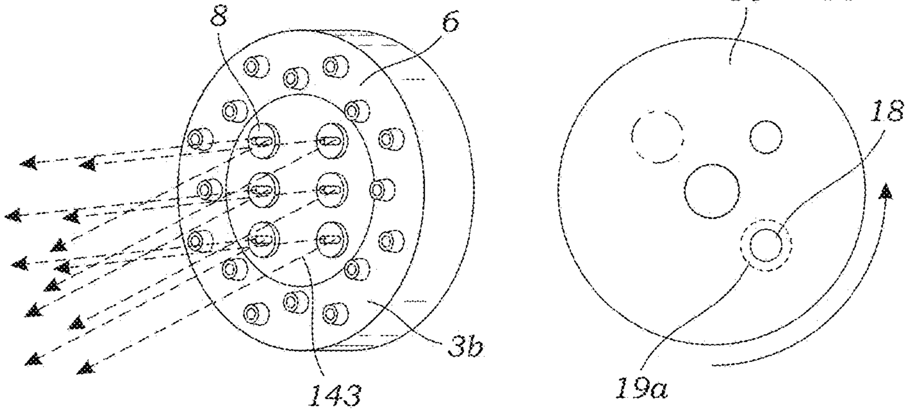
FIG. 49 is a front perspective view of the showerhead rotatable section and a front view depicting the non-rotatable section's two outlets as the align (or don't align) with the rotatable section's inlets 19*a* and 19*c*, with the rotatable section having been rotated 90° relative to its position shown in FIG. 48.
Figure 50:
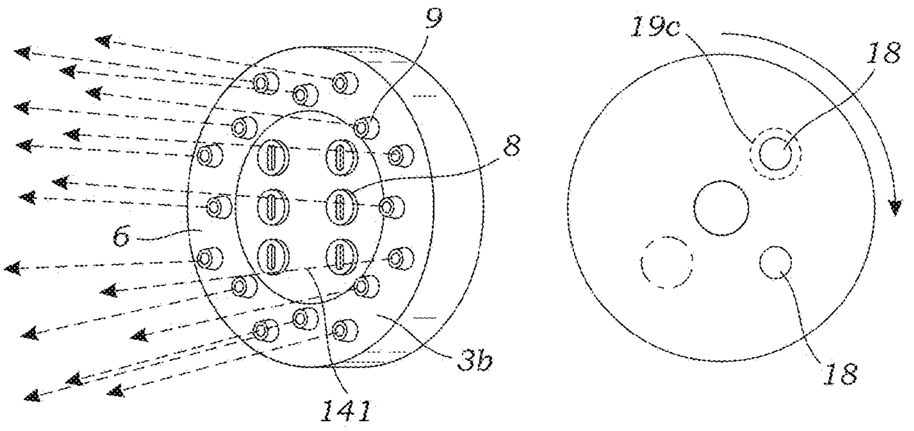
FIG. 50 is a front perspective view of the showerhead rotatable section and a front view depicting the non-rotatable section's two outlets as the align (or don't align) with the rotatable section's inlets 19*a* and 19*c*, with the rotatable section having been rotated 90° relative to its position shown in FIG. 49.
Figure 51:
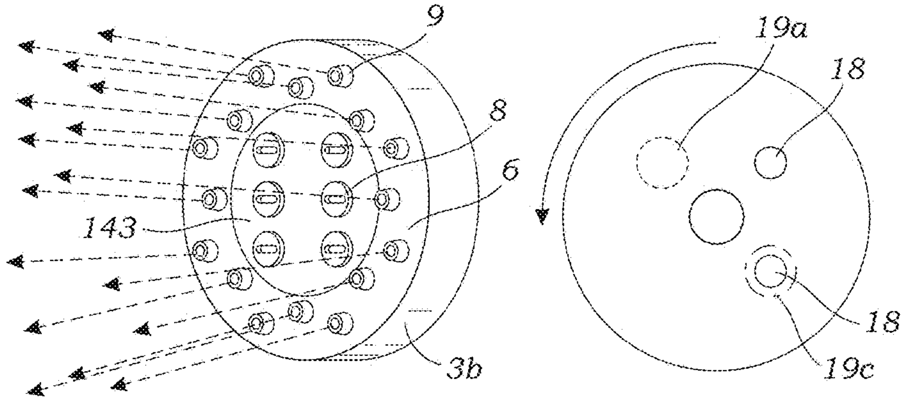
FIG. 51 is a front perspective view of the showerhead rotatable section and a front view depicting the non-rotatable section's two outlets as the align (or don't align) with the rotatable section's inlets 19*a* and 19*c*, with the rotatable section having been rotated 90° relative to its position shown in FIG. 51.
Figure 52:
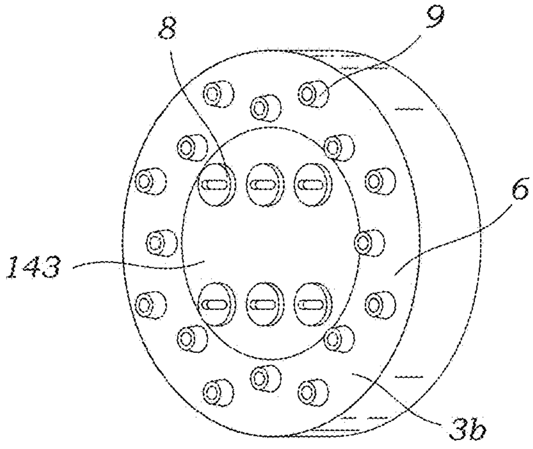
FIG. 52 is a is a front perspective view of an embodiment with the showerhead's rotatable section including six oscillating nozzles in a first orientation and aligned to spray horizontally.
Figure 53:
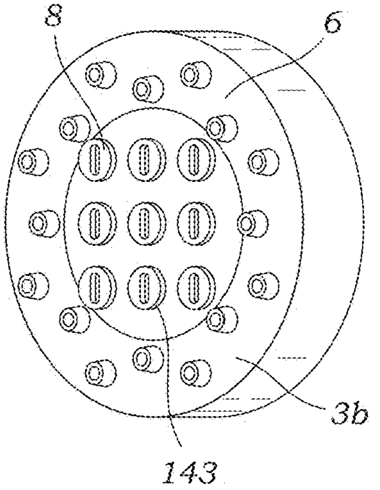
FIG. 53 is a is a front perspective view of an embodiment with the showerhead's rotatable section including nine oscillating nozzles aligned to spray vertically.
Figure 54:
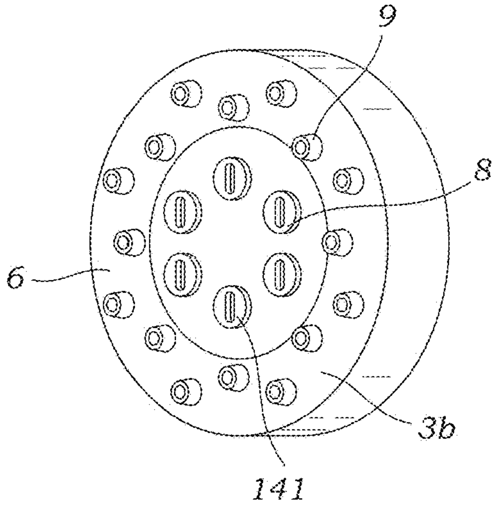
FIG. 54 is a is a front perspective view of an embodiment with the showerhead's rotatable section including six oscillating nozzles in a circular orientation and aligned to spray vertically.
Figure 55:
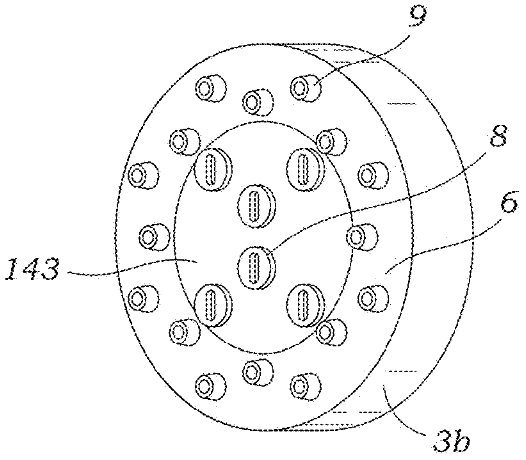
FIG. 55 is a is a front perspective view of an embodiment with the showerhead's rotatable section including six oscillating nozzles in an "X" shaped orientation and aligned to spray vertically.
Figure 56:
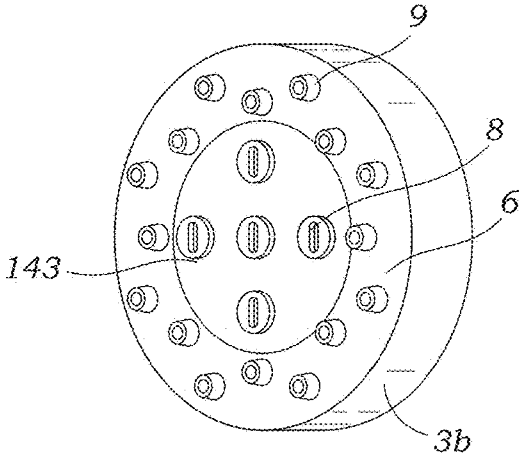
FIG. 56 is a is a front perspective view of an embodiment with the showerhead's rotatable section including five oscillating nozzles in a "T" orientation and aligned to spray vertically.
Figure 62:
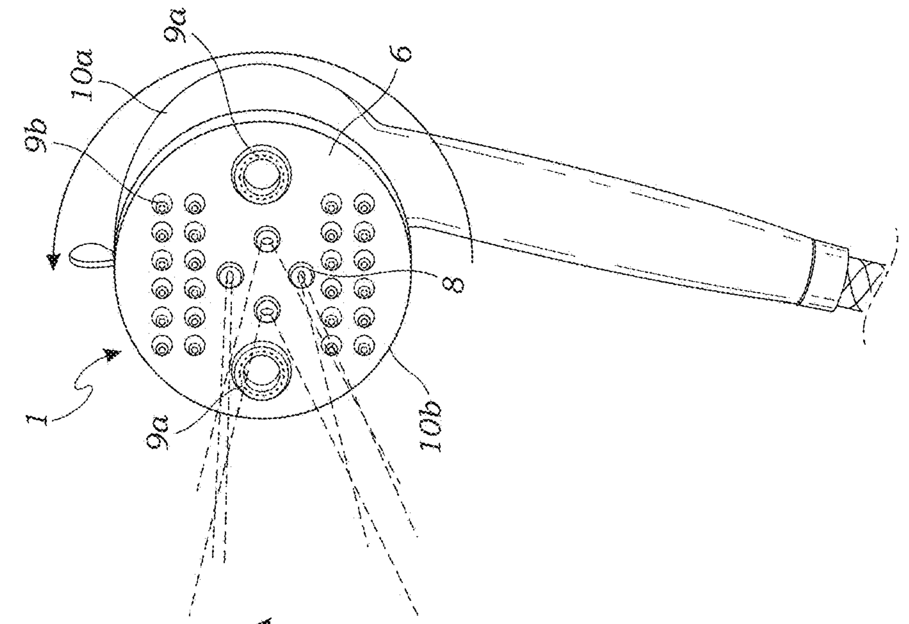
FIG. 62 is a is a front perspective view of the handheld showerhead shown in FIG. 57 wherein the showerhead's rotatable section has been rotated to spray water from the primary nozzles in a diamond pattern.
Figure 61:
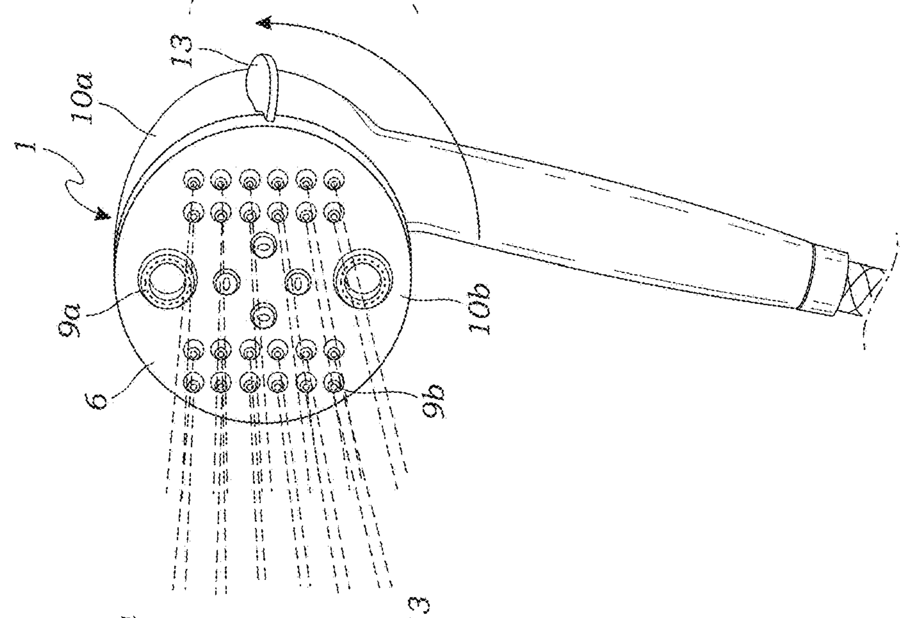
FIG. 61 is a is a front perspective view of the handheld showerhead shown in FIG. 57 wherein the showerhead's rotatable section has been rotated to spray water from the second of the sets of supplemental nozzles in a vertical pattern.
Figure 60:
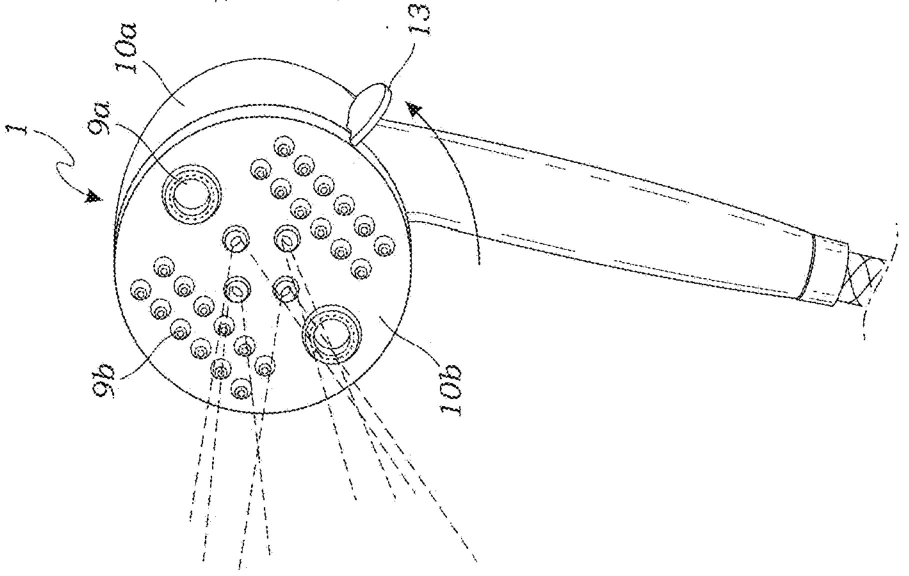
FIG. 60 is a is a front perspective view of the handheld showerhead shown in FIG. 57 wherein the showerhead's rotatable section has been rotated to spray water from the primary nozzles in a square pattern.

FIGS. 46-51 illustrate an alternative embodiment for selectively controlling the spray of water from either the primary nozzles 8 or supplemental nozzles 9. For this embodiment, the non-rotatable section 3*a* includes two water source outlets 18 and the rotatable section 3*b* includes two water inlets 19*a* and 19*c*. In contrast to the embodiment illustrated in FIGS. 1-9 and 16-20, for this embodiment, a plurality of rotatable section inlets are not connected together by a single conduit. Instead, a single non-rotatable section inlet 19*a*-19*d* supplies one set of nozzles, either primary nozzles 8 or supplemental nozzles 9. As best illustrated in FIGS. 46 and 47, the non-rotatable sections outlets 18 are aligned 90° from one another, but the rotatable sections inlets 19*a* and 19*c* are aligned 180° from one another. This arrangement causes the two outlets 18 to only align with one of the rotatable section's inlets 19*a* or 19*c* at any one moment. For example, FIG. 48 illustrates an alignment where a single inlet 19*a* aligns with an upper non-rotatable section's outlet 18 so as to send water to the primary nozzles 8 aligned vertically. Rotation of the rotatable section by 90 degrees, as illustrated in FIG. 49, causes the rotatable sections inlet 19*a* to align with the lower non-rotatable section's outlet 18 so as to continue to allow water to spray from the primary nozzles, now in a horizontal alignment. FIG. 50 illustrates how still an additional 90 degree rotation of the rotatable section causes the rotatable section's inlet 19*c* to now align with the non-rotatable section's upper outlet 18 so as to spray water from the supplemental nozzles. Still a third 90 degree rotation of the rotatable section, as shown in FIG. 51 from its original position shown in FIG. 39, causes the rotatable section's inlet 19*d* to now align with the non-rotatable section's lower outlet 18 so as to spray water from the supplemental nozzles.

The showerhead assemblies 1 illustrated in FIGS. 17-20, and 46-51 provide for a new orientation and/or switch between activation of the primary and supplemental nozzles with each 90° rotation of the assembly's rotatable section 3*b*. However, various modifications may be made without departing from the spirit and scope of the invention. For example, the number and position of the non-rotatable section's water source outlets 18 and/or the number and position of the rotatable sections inlets 19 may be modified so that rotations of greater or lesser amounts than 90° result in changes in the orientation and/or production of water from the primary nozzles 8 and/or supplemental nozzles 9.

As an example only, as illustrated in FIGS. 57-62, the rotatable section 3*b* may have a greater number of inlets 19 than illustrated in the figures so that rotation of the rotatable section 3*b* of only 45° (or less or more) results in activation of a new spray setting. This would be advantageous where a bather desired to align the primary nozzles in more than just a horizontal or vertical orientation. As still an additional example, the rotatable section 3*b* may have a greater number of inlets 19 than shown in FIGS. 17-20, and 46-51 in the event that the showerhead assembly included a third "tertiary" set of nozzles. For example, FIGS. 57-62 illustrate a showerhead assembly 1 including three sets of nozzles including a primary set of nozzles 8, and two secondary sets of nozzles 9*a* and 9*b*. FIG. 58 illustrates a first rotational alignment of the showerhead's rotatable section 10*b* so that water sprays from the first set of supplemental nozzles 9*a* in a horizontal pattern. Clockwise rotation of the showerhead's rotatable section by 90°, from its starting position shown in FIG. 58 to its position illustrated in FIG. 59, causes the water to continue to spray from the first set of supplemental nozzles 9*a*, but now in a vertical pattern. Meanwhile, clockwise rotation of the rotatable section 10*b* by 45° from its starting position in FIG. 58 to its position illustrated in FIG. 60, causes water to spray from its second set of supplemental nozzles 9*b*. Conversely, counterclockwise rotation of the rotatable section by 45° from its starting position in FIG. 58 to its position illustrated in FIG. 61, causes water to spray from its primary nozzles 8. Continued counterclockwise rotation of the rotatable section by 45° to its position illustrated in FIG. 62 causes water to spray from its second set of supplemental nozzles 9*b* which are not aligned vertically. Finally, counterclockwise rotation of the rotatable section by 180° from its starting position in FIG. 58 to its position illustrated in FIG. 63, causes water to spray from its primary nozzles 8, but in an orientation 45° rotated from its position shown in FIG. 61. Though not shown in the Figures, additional inlets and conduits would be required to supply water from the non-rotatable section 10*a* to the tertiary nozzles in the rotatable section 10*b*.

Still additional modifications can be made by those skilled in the art to provide a greater variety of orientations and spray patterns without departing from the spirit and scope of the invention.

Showerhead Assembly with a First Oscillating Nozzle Embodiment

A preferred showerhead includes primary nozzles 8 which oscillate from one direction to another. With reference to FIGS. 1-4 and 21-27, in a first preferred embodiment, the nozzles 86 oscillate due to a oscillating mechanism 20 which includes three gear portions: a propeller 32, a toothed pinion 34, and a large toothed gear 36. Specifically, water flows through one or more water passageways 11 into a cavity 12. The water then passes through the propeller 32, thereby causing the propeller 32 to rotate in a counterclockwise direction. Even more specifically, the pinion 34 extends co-axially from the propeller 32 and rotates in a counter-clockwise direction upon counter-clockwise rotation of the propeller 32. Additionally, the toothed gear 36 is in toothed engagement with the pinion 34 so as to rotate by rotation of the pinion. Specifically, the toothed gear 36 revolves in a clockwise direction as the pinion 34 rotates counterclockwise, and water continues to flow through the entirety of the gear train 21. More specifically, a pin is seated on the outer surface of the toothed gear. The pin is offset to the toothed gear's central axis which causes the pin to rotate in a circular path as a result of the rotation of the toothed gear.

Still with reference to FIGS. 1-4 and 21-27, the first embodiment of an oscillating nozzle assembly 20 includes a gear train 21 and an oscillating nozzle chamber system 80 is shown. For this embodiment, the oscillating nozzle chamber system 80 includes two shoulder arms 91, 93 and a cylindrical nozzle housing 82 having a central chamber 83. Preferably, the pin 38 is seated on the surface of the large-toothed gear 36 and engages with the pin slot 84 located on the cylindrical nozzle housing 82 so as to work in concert with the nozzle chamber system 80, ultimately leading to the nozzle's 27 oscillating motion. Specifically, as the large-toothed gear 36 rotates, the pin 38 oscillates 45° back and forth within the pin slot 84. More specifically, the oscillating movement of the pin 38 causes the nozzle housing 82 to rotate.

Moreover, water passes through the nozzle chamber system 80. The nozzle chamber system 80 is comprised of a right solid shoulder arm 91 and a left hollow shoulder arm 93. The left hollow shoulder arm 93 houses a central channel 90 which receives water from the cavity 12. Further, the right shoulder arm 91 functions as a support arm for the nozzle housing 82. Notably, the two shoulder arms 93, 91 hold the nozzle housing 82 in position along a longitudinal axis so as to prevent horizontal movement as water sprays out of the oscillating nozzle chamber's outlet 86.

In the preferred embodiment, the nozzle housing 82 includes a first end and a second end. Additionally, two spindles 95 encircle the exit of the central channel 90 and adjoin the left shoulder arm 93 to the nozzle housing 82 by the first end. Specifically, the two spindles 95 include a bearing 97 and rotate between ten degrees and thirty degrees in an upward and downward trajectory upon movement of the nozzle housing 82 caused by the pivoting of the pin 38 in the pin slot 84. More specifically, the pin's 38 movement causes the ten-to-thirty-degree vertical oscillation of the two spindles 95.

Also preferably, the right shoulder arm 91 is adjoined to the second end of the nozzle housing 82 by way of an axle 99. Specifically, and as a result of the pin 38 pivoting within the pin slot 84 and causing the nozzle housing 82 to rotate, the axle 99 oscillates between ten degrees and thirty degrees upwardly and downwardly upon a vertical axis. Importantly, the oscillating pin 38 forces the nozzle housing 82 to pivot back and forth with a rotation between ten and twenty degrees while the two shoulder arms 93, 91 hinder the nozzle housing's 82 horizontal movement. Further, the pin system, in combination with the functions of the shoulder arms 25, restricts the nozzle housing's 82 movement along a vertical axis so as to generate the reciprocating motion of the nozzle housing 82.

As illustrated in FIGS. 21-27, a nozzle outlet 86 extends from the nozzle housing 82. As water from the central channel 90 enters the nozzle housing's central cavity 83, it is ejected out through the nozzle outlet 86. As a result of the reciprocating motion of the nozzle housing 82 caused by the oscillating pin 38, such water disperses out of the nozzle outlet 86 in an oscillating spray pattern.

Preferably, and as illustrated in FIGS. 21-27, the cavity 12 is substantially larger than the diameter of the propeller 32, pinion 34, and large toothed gear 36. This disparity in size provides a space around the gear train 21 through which water can flow. The additional space is provided to account for bathers who attempt to physically hold the cylindrical nozzle chamber 82 in a fixed position. Without this additional space, water flow would be completely blocked which could result in a build-up of water pressure that could damage the internal components of the showerhead. Instead, if movement of the cylindrical nozzle housing 82 is impeded, water continues to flow around the propeller 32, pinion 34 and large toothed gear 36, and then through the central channel 90 to the nozzle housing's central cavity 83. Thus, even though the movement of the nozzle housing is impeded, water is still ejected out through the nozzle outlet 86. Once the nozzle housing's movement is once again unobstructed, the oscillating motion starts again. Moreover, the preferred embodiment has a nozzle housing 82 that rotates about a horizontal axis so as to provide a spray that oscillates up and down. However, the nozzle housing may be oriented in any direction, such as vertically to provide a spray that oscillates side-to-side.

Showerhead Assembly with a Second Oscillating Nozzle Embodiment

Figure 21:
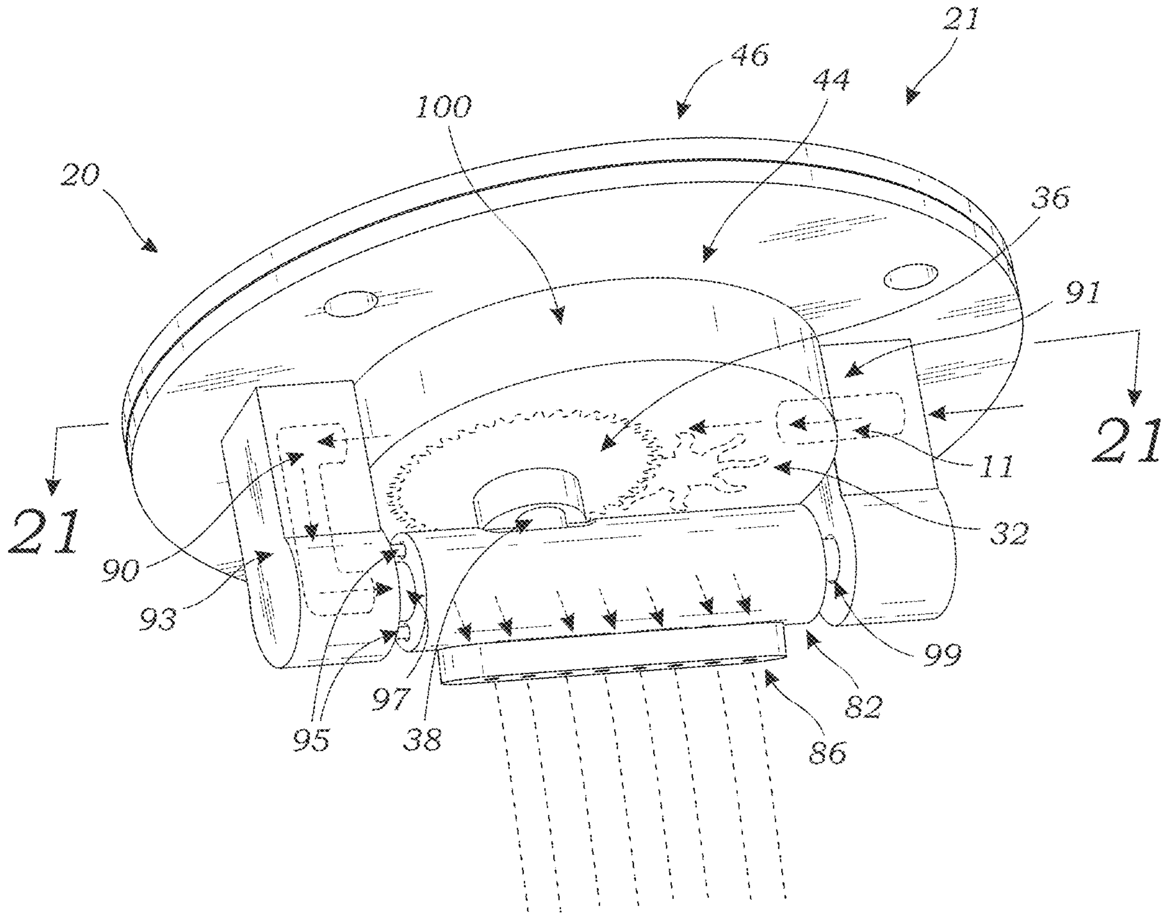
FIG. 21 is a perspective view of a first embodiment of a compound gear mechanism illustrating a gear train adjoined to the nozzle chamber system and the flow of water from the gear train through nozzle chamber system, whereby such water is ejected from the oscillating nozzle outlet at a downward angle.

FIGS. 28-37 illustrate a second embodiment of an oscillating nozzle assembly 20 which includes a gear train 21 and an oscillating nozzle chamber system 80. The embodiment described in FIGS. 28-37 is similar to the embodiment depicted in FIGS. 21-27 except that the embodiment depicted in FIGS. 28-37 includes a rocker plate 112 and a swinging lever 114 instead of a pin slot to transfer an oscillating motion to the nozzles 86. Preferably, the rocker plate 112 is disposed within the gear housing 100. More preferably, the rocker plate 112 is mounted on the gear housing 100 in the front plate 44. Even more preferably, the rocker plate 112 comprises a first aperture 115 and a second aperture 116, wherein the first aperture 115 is sized configured for receipt of the lever 114 and the second aperture 116 is sized and configured for receipt of a fixed support rod 117. Specifically, and as best shown in FIGS. 20 and 21, the lever 114 is operatively coupled with a fulcrum bar 118 and is configured to swing back and forth within the first aperture 115 in response to a force exerted by the rocker plate 112 as the rocker plate 112 pivots within a horizontal plane. In this regard, the fulcrum bar 118 defines the lever's 114 axis of rotation, and the first aperture's 115 size and dimension defines a maximum trajectory of the lever 114 as it swings from a first side to a second side. Further, the support rod 117 is configured to secure the rocker plate 112 on the front plate 44 and define an axis of rotation for the rocker plate 112 as it pivots along the horizontal axis. In preferred embodiments, the rocker plate 112 is configured to move side to side (e.g., left to right). However, those of skill in the art will recognize that the rocker plate 112 can move in any direction, such as in an up and down direction, without departing from the scope of the invention.

Figure 27:
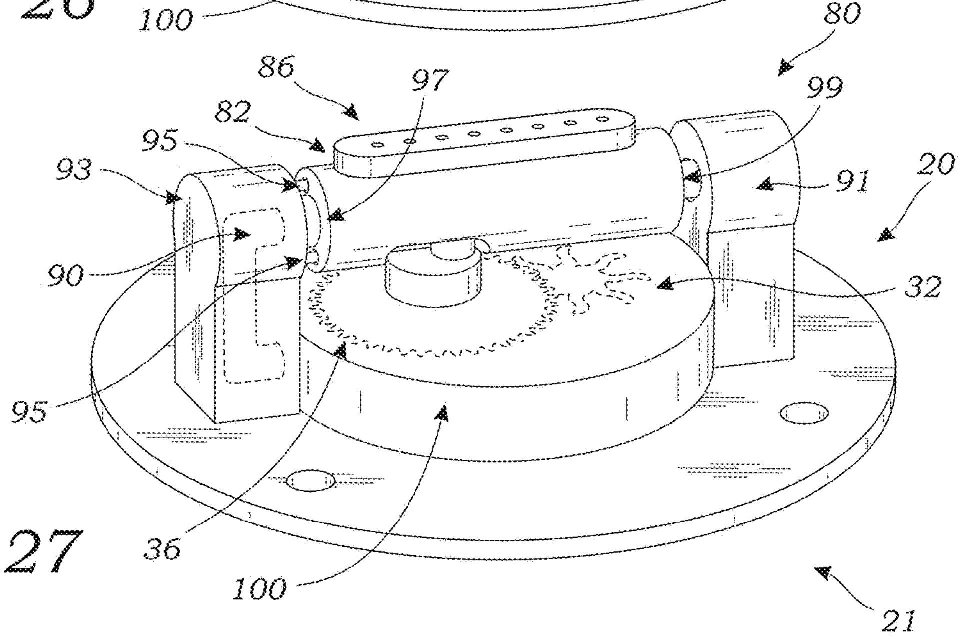
FIG. 27 is a top view of the compound gear mechanism illustrated in FIGS. 21-26 illustrating the large gear pin residing within the nozzle chamber's pin slot.
Figure 28:
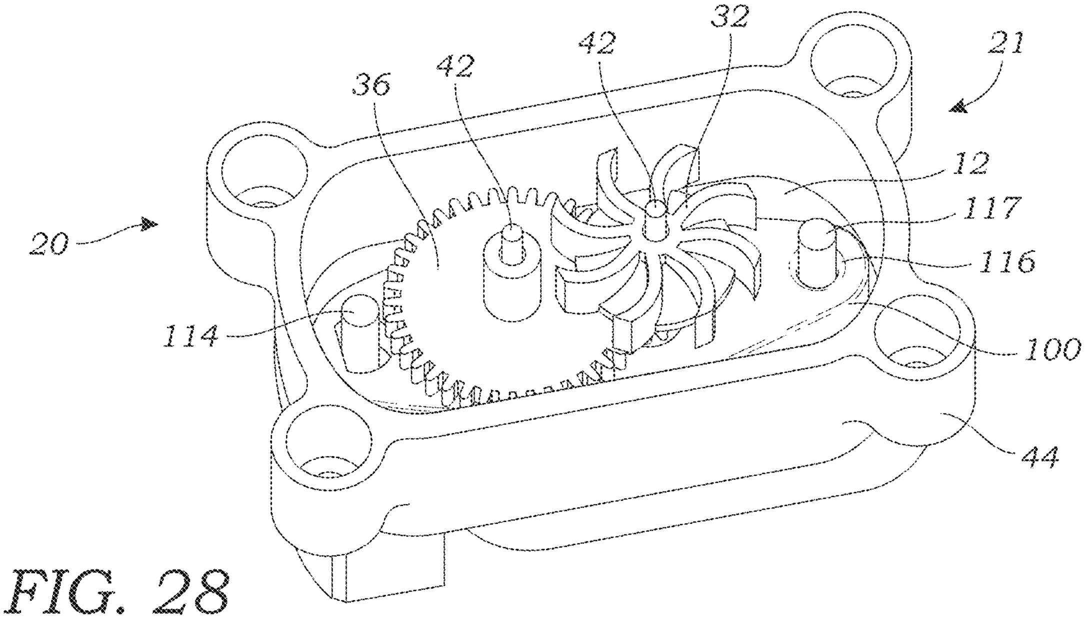
FIG. 28 is a bottom perspective view illustrating a second preferred embodiment of a compound gear mechanism for which swivels the nozzles within a showerhead assembly.
Figure 29:
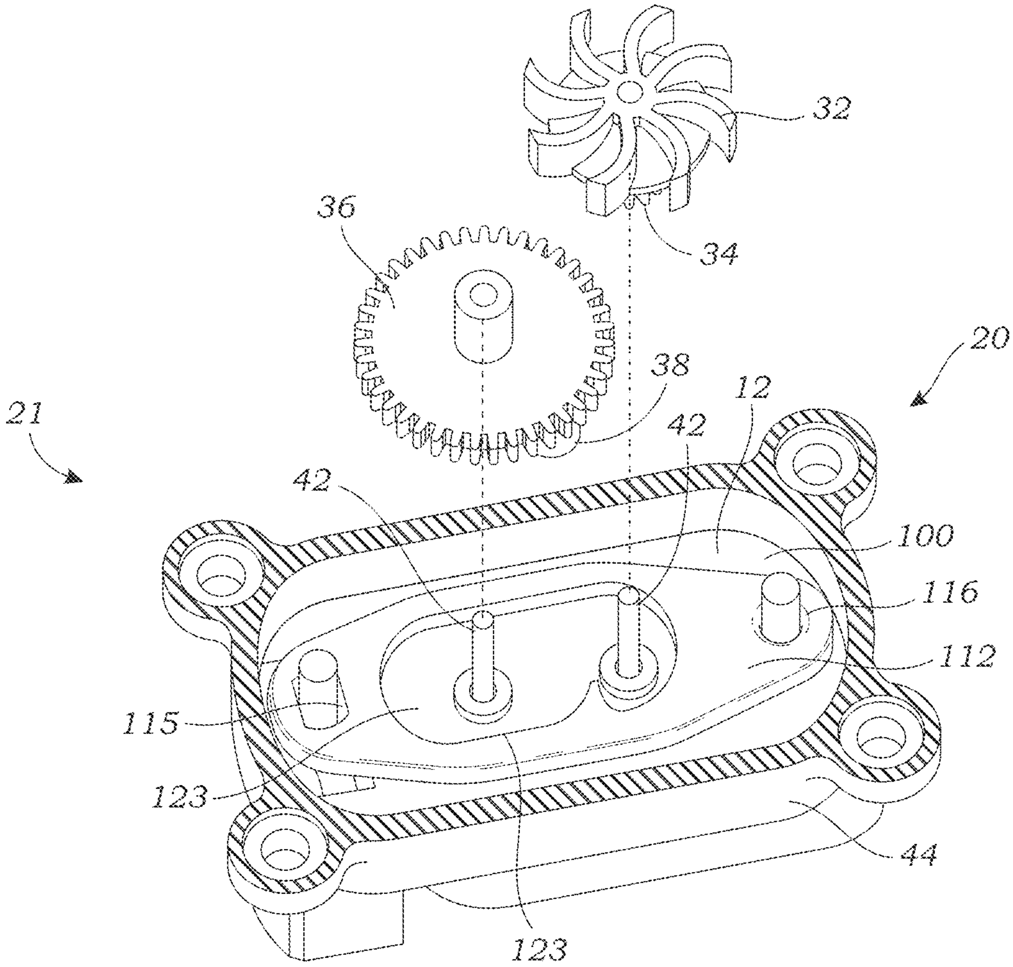
FIG. 29 is a partially exploded bottom view of the compound gear mechanism illustrated in FIG. 28.
Figure 30:
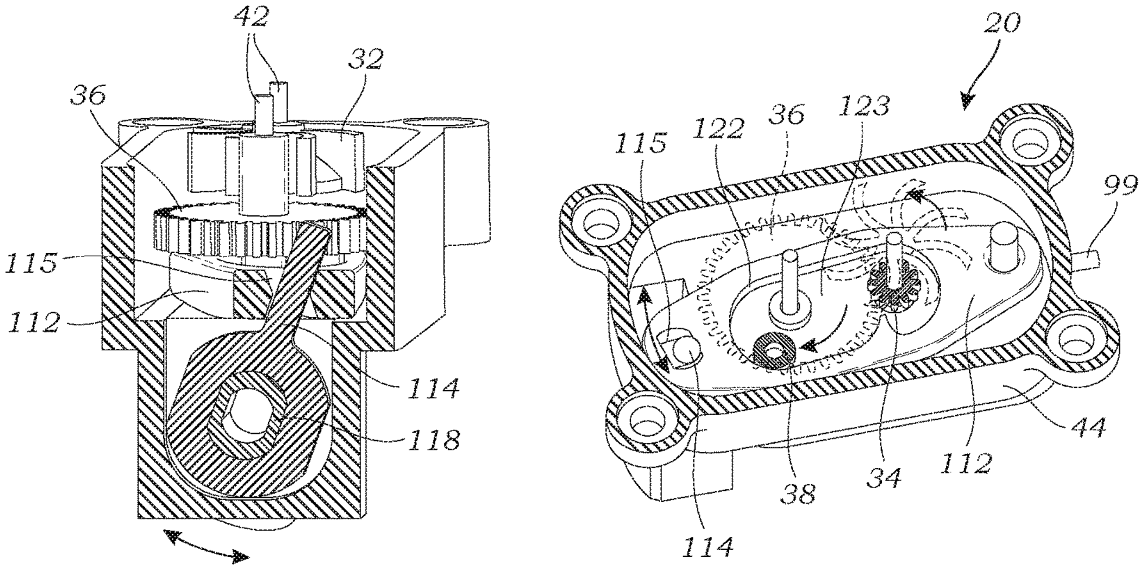
FIG. 30 is a side cutaway view and bottom cutaway view of the compound gear mechanism depicted in FIGS. 28 and 29, illustrating the propeller rotating in a counterclockwise direction, the toothed gear and pin rotating in a clockwise direction, and the lever swinging to a first side.
Figure 31:
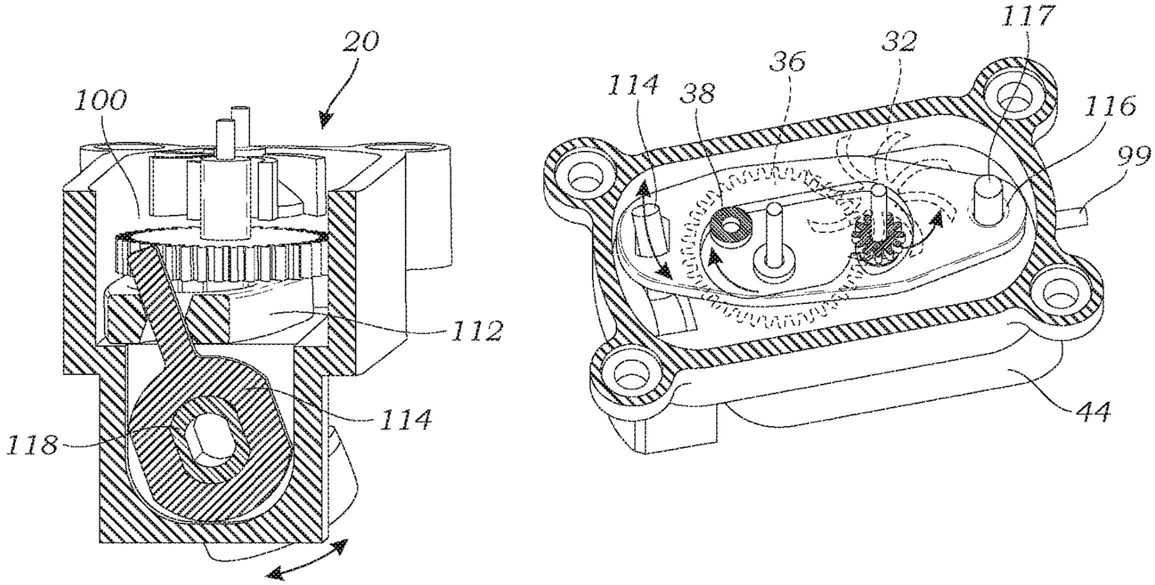
FIG. 31 is a side cutaway view and bottom cutaway view of the compound gear mechanism depicted in FIGS. 28-30, illustrating the propeller rotating in a counterclockwise direction, the toothed gear and pin rotating in a clockwise direction, and the lever swinging to a second side.

In preferred embodiments, intake 4 (illustrated in FIGS. 1-4) transports water through one or more water passageways 11 upstream, directly adjacent to and in fluid connection with the gear train 21. More specifically, water flows through the one or more water passageways 11 into the cavity 12. As illustrated in FIGS. 27 and 2. preferably the one or more water passageways 11 include one or more inlets 119 and corresponding outlets 120. More preferably, the one or more inlets 119 are offset relative to their corresponding outlets 120 so as to produce an angled water stream. Even more preferably, the assembly includes three angled inlets 119 outlets 120.

In the preferred embodiment depicted in FIGS. 28-37, the angled inlets 119 are formed on the back plate 46 so as to allow water to pass therethrough and into the cavity 12 and through the compound gear mechanism 21. In this way, water from the inner chamber of the showerhead face 7 is transported through the one or more angled inlet(s) 119 so as to travel downstream through the gear train 21 (i.e., to the propeller 32) at an angled trajectory (e.g., a counterclockwise direction), thereby causing rotation of the propeller 32.

Preferably, the pin 38 is seated on the surface of the toothed gear 36 and engages with the rocker plate 112 disposed within the gear housing 100. Specifically, and as best shown in FIGS. 21-28, the rocker plate 112 includes a pin engaging lip 122 along its inner perimeter, whereby the pin engaging lip 122 is configured to engage with the pin 38. Further, the pin engaging lip 122 defines an inner space 123 of the rocker plate 112. In the preferred embodiment, the arbors 42 extend through the inner space 123 (see, e.g., FIGS. 30-31) and are mounted in receiving structures on the front plate 44. In some embodiments, and as best shown in FIGS. 30-34, the propeller 32 and toothed gear 36 are configured to extend outwardly relative to the pin engaging lip 122 and are positioned adjacent to and upstream of the rocker plate 112. Preferably, the pin 38 is positioned offset relative to the toothed gear's 36 central axis so that at least a portion thereof can engage with the rocker plate 112.

Specifically, as water flows through the propeller 32, thereby causing the propeller 32 and toothed pinion 34 to rotate, the toothed gear 36 rotates and causes the pin 38 to rotate in a circular path along the pin engaging lip 122. More specifically, the rotation of the pin 38 causes the rocker plate 112 to move or pivot along the horizontal axis. In this regard, as the pin 38 engages with the pin engaging lip 122 and causes the rocker plate 112 to move, the lever 114 swings from side to side, thereby causing the nozzle housing 82 to oscillate. As such, the compound gear mechanism 21 works in concert with the nozzle chamber system 80, ultimately leading to the nozzle's 27 oscillating motion.

The oscillating nozzle chamber system 80 depicted in FIGS. 28-37 is similar to the oscillating nozzle chamber system 80 depicted in FIGS. 21-27, except that it includes one shoulder arm 93. The hollow shoulder arm 93 houses the central channel 90 which receives water from the cavity 12. Further, an axle 99 extends longitudinally through a portion of the nozzle housing 82 and the gear housing 100, and functions as a support structure for the nozzle housing 82. Preferably, the axle 99 extends through a side opposite the side of the shoulder arm 93. For example, the shoulder arm 93 can be oriented along a left side of the gear housing 100 and nozzle housing 82, and the axle 99 can be oriented along a right side of the gear housing 100 and nozzle housing 82, or vice versa. Notably, the hollow shoulder arm 93 and axle 99 hold the nozzle housing 82 in position along a longitudinal axis so as to prevent horizontal movement as water sprays out of the oscillating nozzle chamber's outlet 86.

Figure 32:
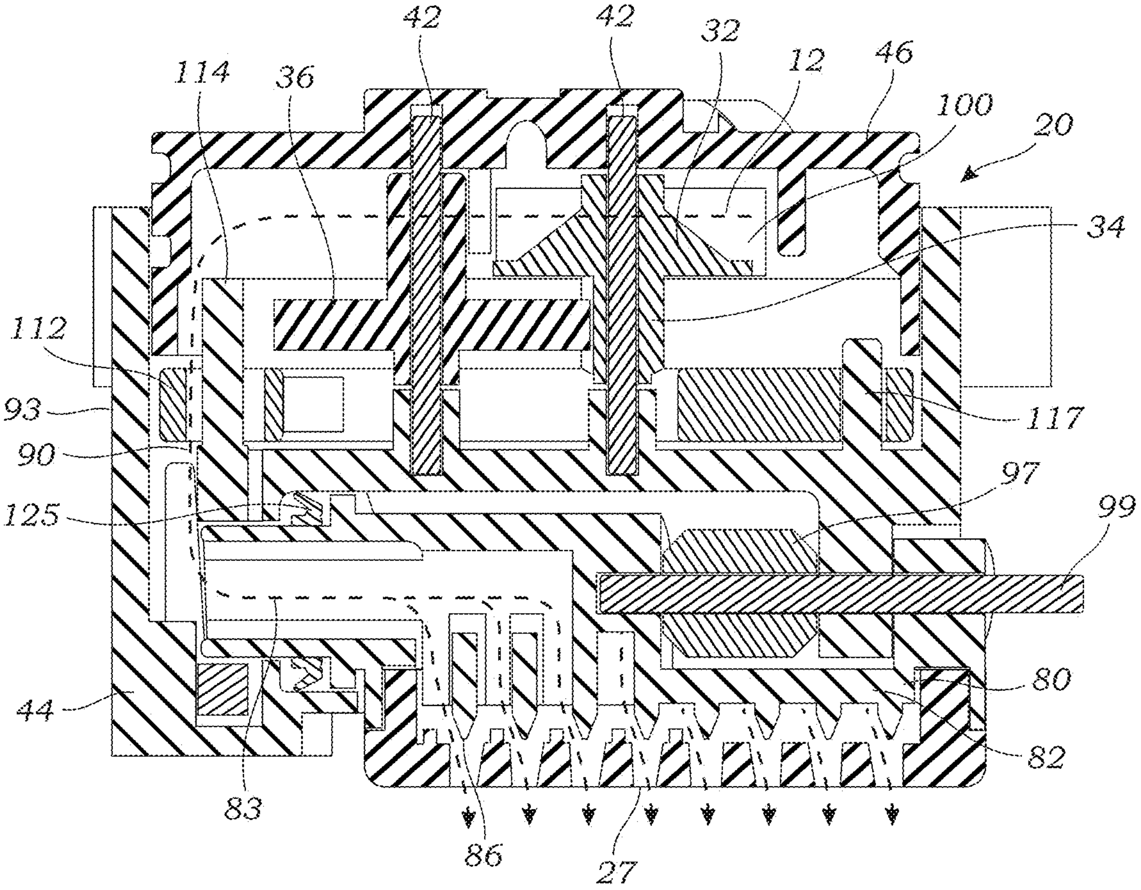
FIG. 32 is a side cutaway view of the gear housing and nozzle housing of the compound gear mechanism depicted in FIGS. 28-31, illustrating the water passageway as water expels through the oscillating nozzles.
Figure 33:
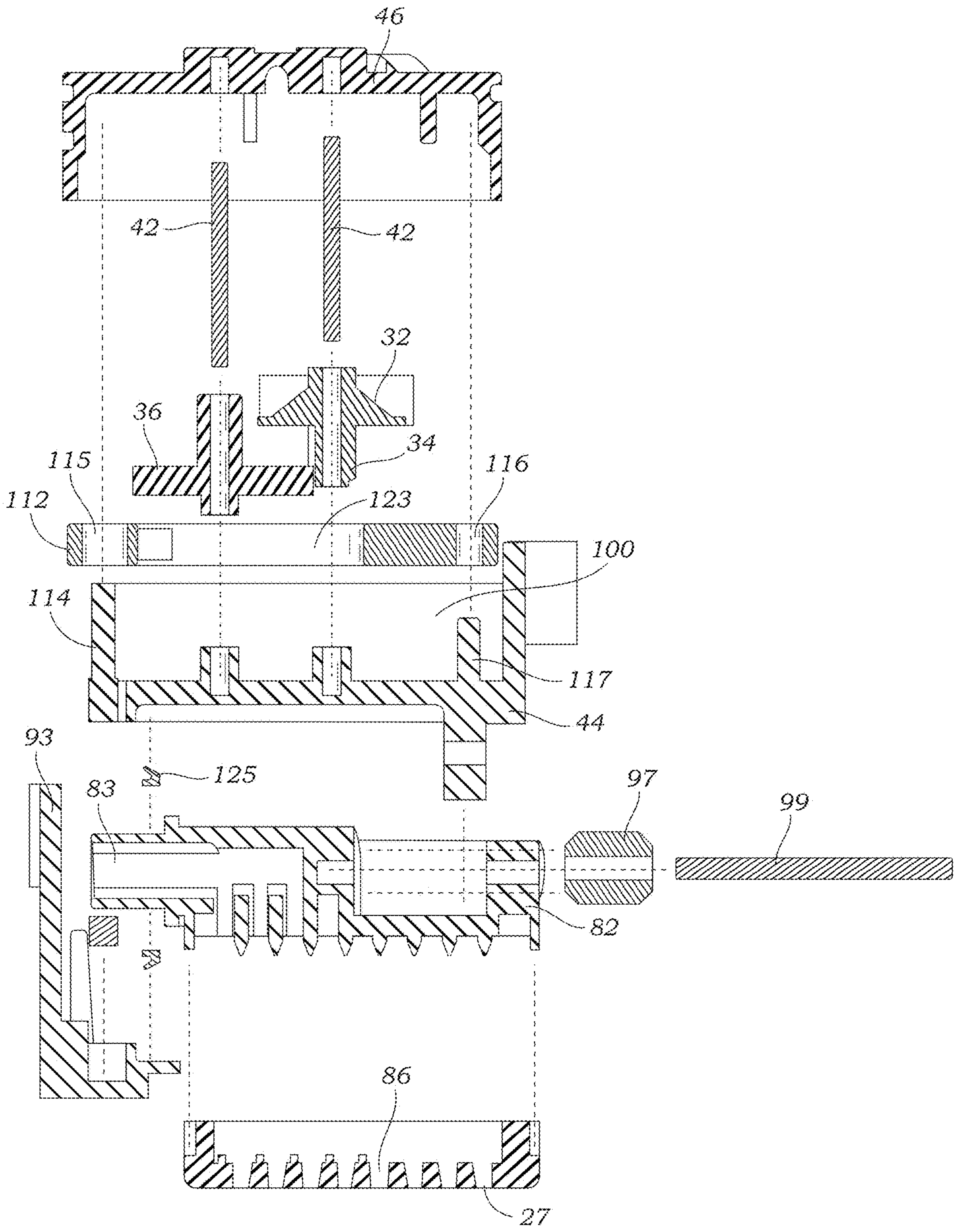
FIG. 33 is an exploded side view of the gear housing and nozzle housing depicted in FIGS. 28-32.
Figure 34:
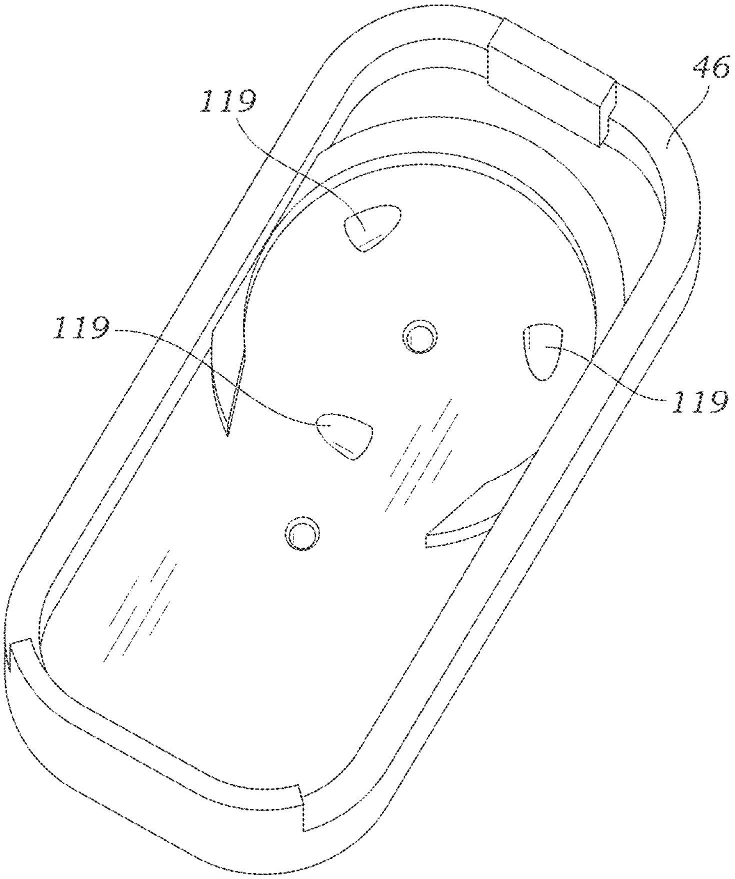
FIG. 34 is a front perspective view of an exemplar embodiment of a back plate which introduces water into the gear housing and nozzle assembly shown in FIGS. 28-33.
Figure 35:
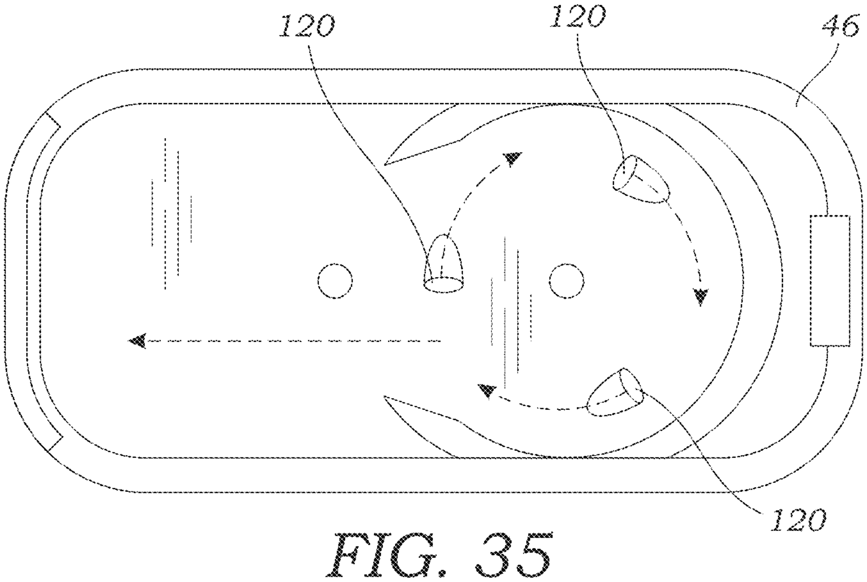
FIG. 35 is a front perspective view of the back plate depicted in FIG. 34, illustrating the flow of water through the water passageways.
Figure 36:
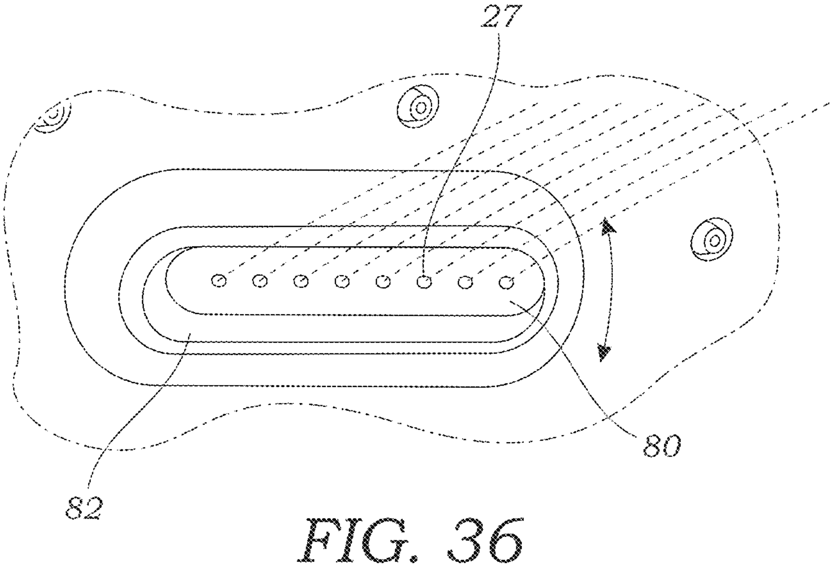
FIG. 36 is a front perspective view of the oscillating nozzle housing of a showerhead assembly, illustrating the nozzles angled in an upward direction and spraying water therefrom.
Figure 37:
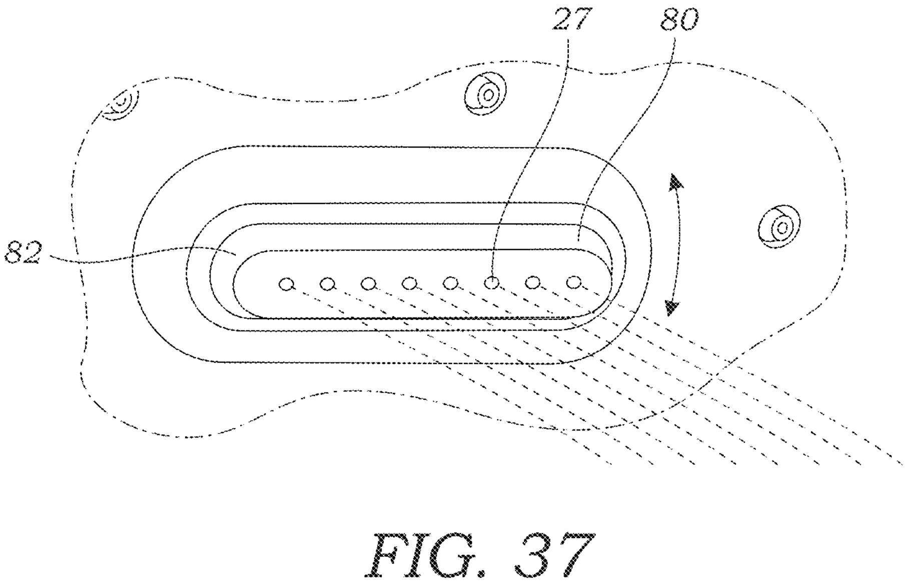
FIG. 37 is a front perspective view of the oscillating nozzle housing depicted in FIG. 36, illustrating the nozzles angled in a downward direction and spraying water therefrom.
Figure 38:
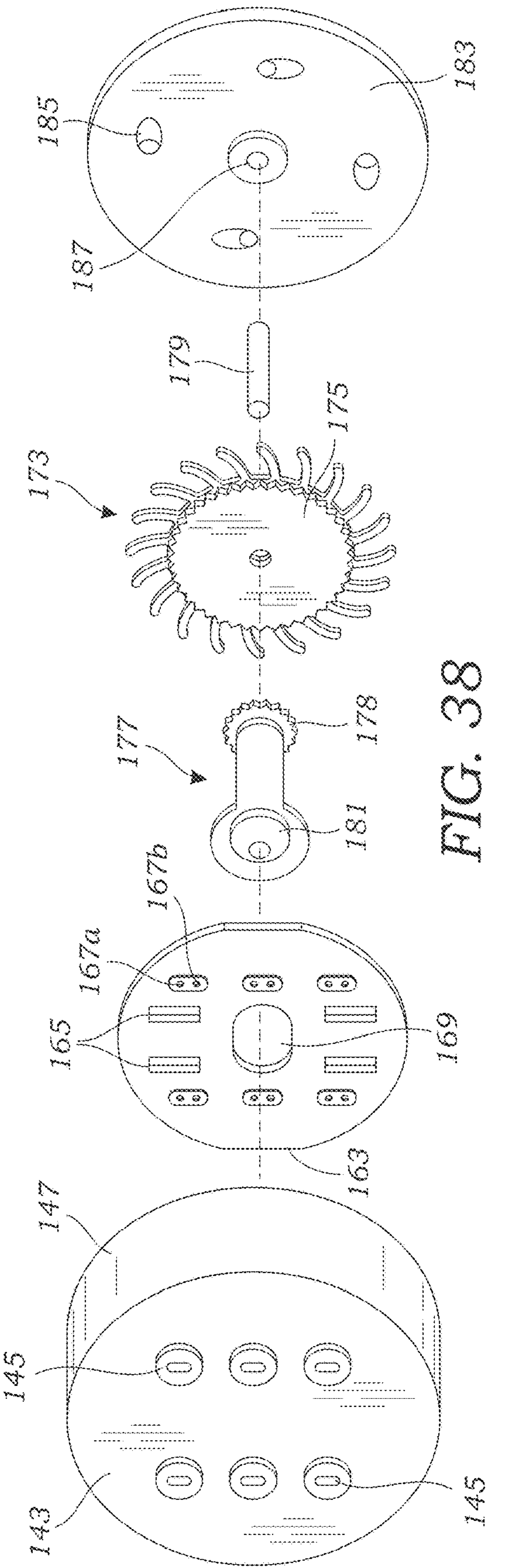
FIG. 38 is an exploded front perspective view of an alternative embodiment for an oscillating nozzle assembly.

In the preferred embodiment, the nozzle housing 82 includes a first end and a second end. Additionally, and as best depicted in FIGS. 32-33, the axle 99 extends through a bearing 97 in the nozzle housing 82 and adjoins the shoulder arm 93 to the nozzle housing 82 by the first end. Specifically, the axle 99 rotates (e.g., between ten degrees and thirty degrees) in an upward and downward trajectory upon movement of the nozzle housing 82 caused by the pivoting of the pin 38 along the rocker plate 112 and oscillation of the lever 114.

Specifically, and as a result of the pin 38 pivoting along the rocker plate 112 and the lever 114 oscillating and causing the nozzle housing 82 to rotate, the bearing 97 oscillates (e.g., between ten degrees and thirty degrees) upwardly and downwardly upon a vertical axis. Importantly, the oscillating lever 114 forces the nozzle housing 82 to pivot back and forth with a rotation (e.g., between ten and twenty degrees) while the shoulder arm 93 and axle 99 hinder the nozzle housing's 82 horizontal movement. Further, the pin system, in combination with the functions of the shoulder arm 93 and axle 99 restrict the nozzle housing's 82 movement along a vertical axis so as to generate the reciprocating motion of the nozzle housing 82.

Figure 22:
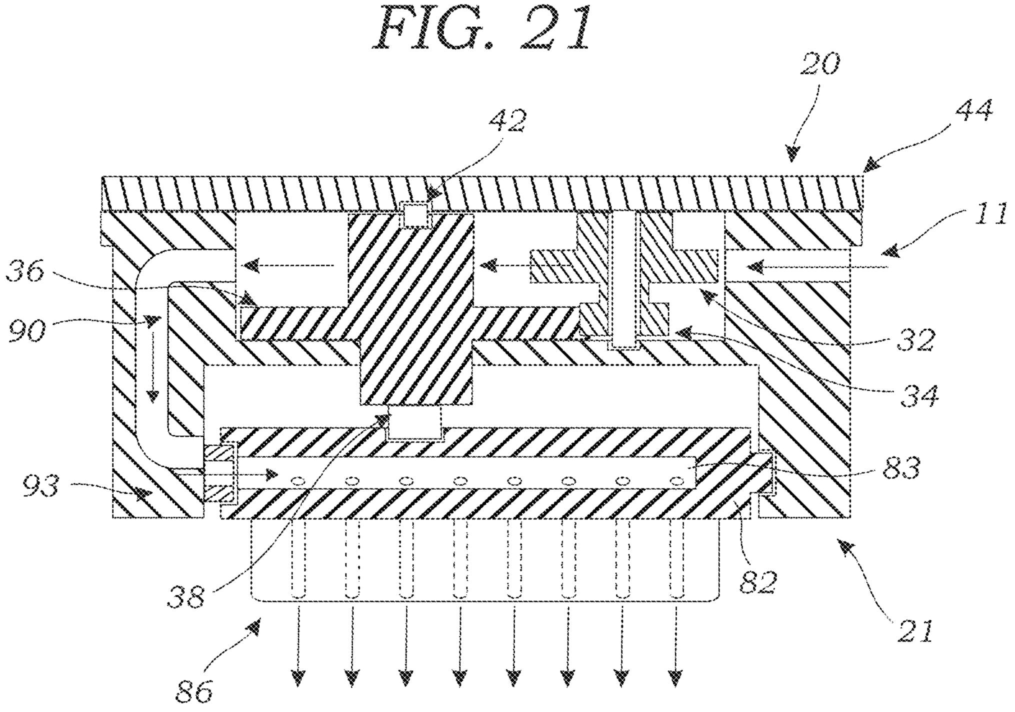
FIG. 22 is a perspective cutaway view of the compound gear mechanism illustrated in FIG. 21 illustrating the flow of water through the gear train and nozzle chamber system, wherein water is ejected from the oscillating nozzle outlet at a downward angle.
Figure 23:
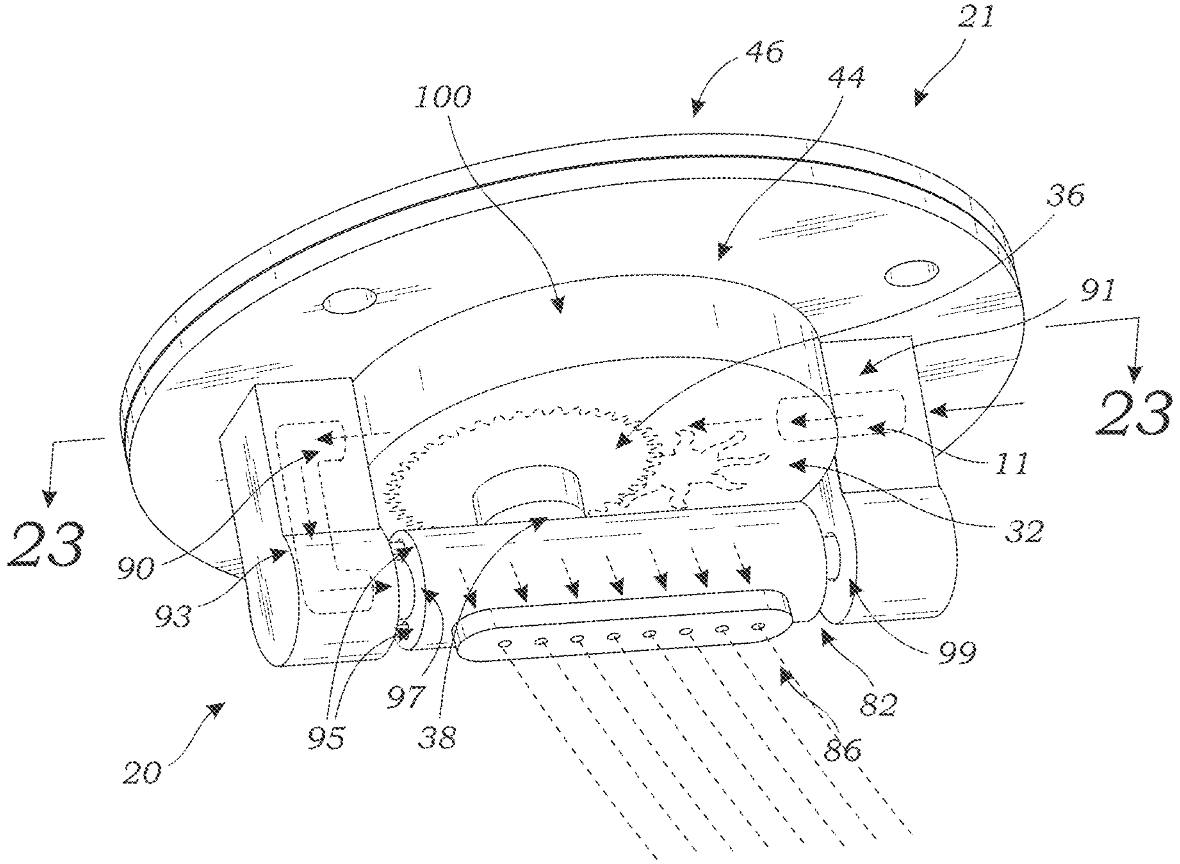
FIG. 23 is a left perspective view of the compound gear mechanism illustrated in FIG. 21 wherein the oscillating nozzle is expelling water at an upward angle.
Figure 24:
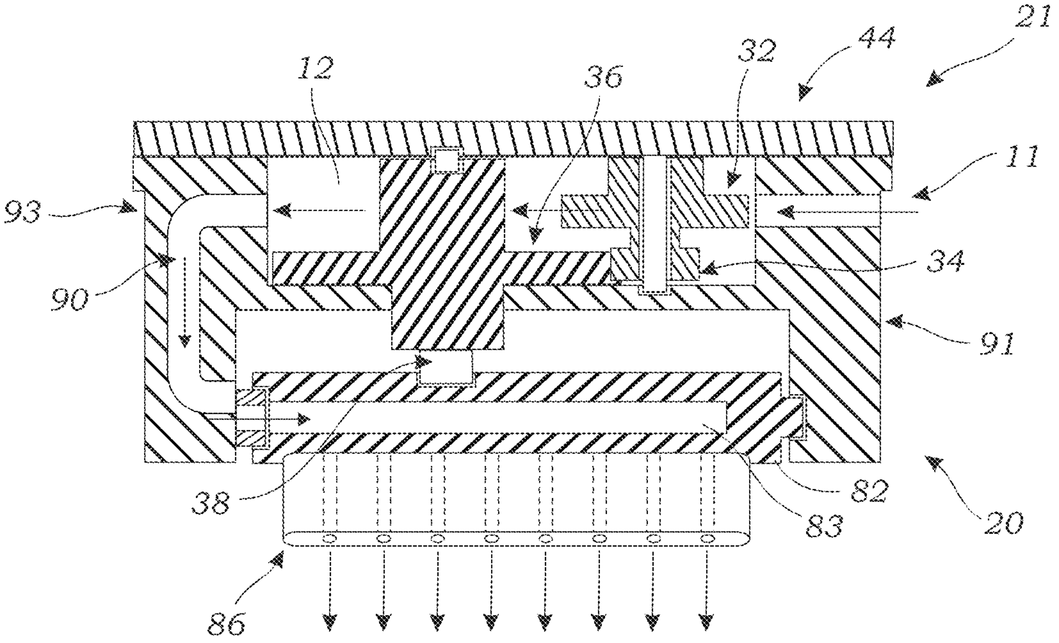
FIG. 24 is a left side cutaway view of the showerhead assembly illustrated in FIG. 23 wherein the compound gear mechanism is housed within the showerhead housing, illustrating the flow of water from the conduit through the gear train, whereby water is released into the nozzle chamber system and ejected from the oscillating nozzle outlet at an upward angle.
Figure 25:
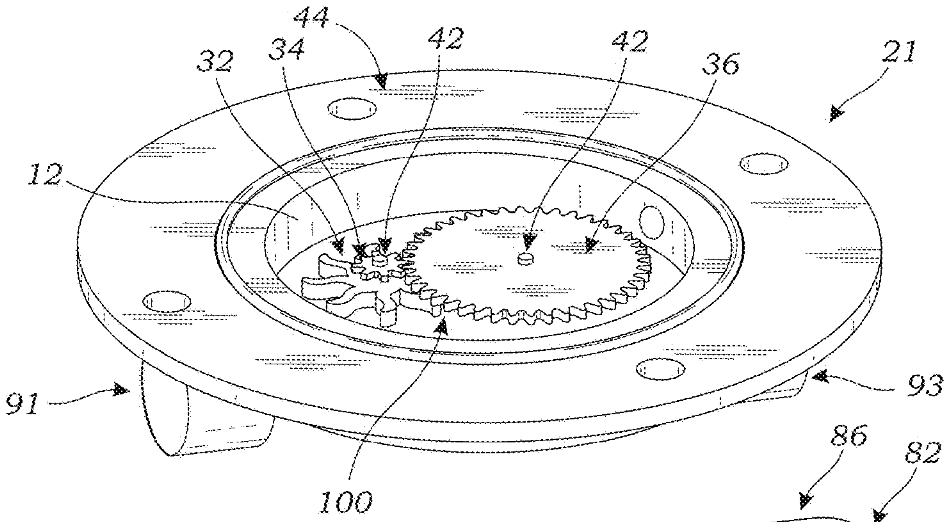
FIG. 25 is a bottom perspective view of the compound gear mechanism illustrated in FIGS. 21-24 illustrating gear train adjoined to the nozzle chamber system.
Figure 26:
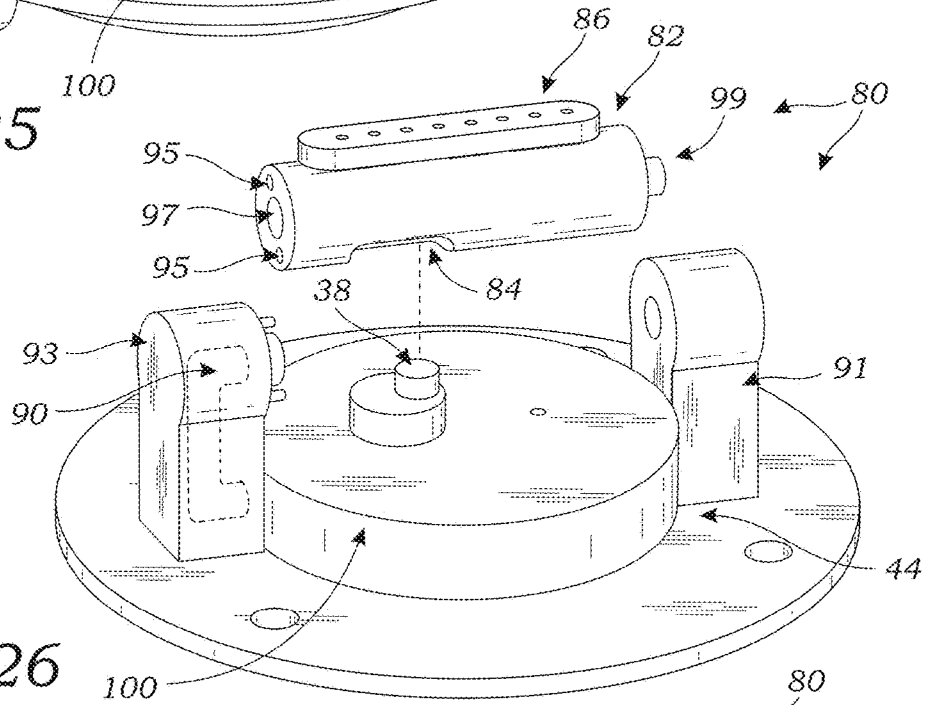
FIG. 26 is a partially exploded top view of the compound gear mechanism illustrated in FIG. 25 illustrating the nozzle chamber's pin slot which seats the pin residing on the large gear of the gear train.

Further, the nozzle chamber system 80 illustrated in FIGS. 28-37 includes a cylindrical nozzle housing 82 having a central chamber 83 in fluid communication with the central channel 90. As illustrated in FIGS. 22-23, a nozzle outlet 86 extends from the nozzle housing 82 and is in fluid communication with the central chamber 83. As water from the central channel 90 enters the nozzle housing's central chamber 83, it is ejected out through the nozzle outlet 86 (see, e.g., FIGS. 26-27). As a result of the reciprocating motion of the nozzle housing 82 caused by oscillating lever 114, such water disperses out of the nozzle outlet 86 in an oscillating spray pattern, as shown in FIGS. 26-27.

Preferably, and as best illustrated in FIGS. 32-37, the cavity 12 is substantially larger than the diameter of the propeller 32, pinion 34, and toothed gear 36. Moreover, the preferred embodiment has a nozzle housing 82 that rotates about a horizontal axis so as to provide a spray that oscillates up and down. However, the nozzle housing 82 may be oriented in any direction, such as vertically to provide a spray that oscillates side-to-side.

In some embodiments, the nozzle housing 82 can also comprise one or more sealing members 125, sealing rings, or mechanical gaskets, such as an O-ring (see, e.g., FIGS. 32-33). Specifically, one or more sealing members 125 can be around the central channel 90, upstream of the one or more oscillating nozzles 27. In this manner, the sealing member 125 (e.g., O-ring) mitigates or prevents water leaking from the showerhead assembly 1.

Showerhead Assembly with a Third Oscillating Nozzle Embodiment

A third embodiment of an oscillating nozzle assembly is illustrated in FIGS. 38-64. However, instead of the nozzles 8 oscillating as described in prior embodiments 1 and 2, each nozzle 8 is fixed in place, but produces an oscillating side-to-side (or up-and-down) spray which provides the appearance and sensation as if the nozzle were physically moving. For this embodiment, the showerhead includes oscillating spray assembly 141, which in turn includes a faceplate 143, oscillator nozzles 145 which project through the faceplate 143, a central cavity 189, and an internal circular rim 147. The oscillator nozzles 145 project through the faceplate 143 from the central cavity 189 to the showerhead's face. The showerhead may include any number of oscillator nozzles 145 including a single nozzle, or a plurality of nozzles, including but not limited to, five nozzles shown in FIG. 56, or nine nozzles shown in FIG. 53. Furthermore, and as illustrated in FIGS. 52-64, the oscillator nozzles may be arranged in any pattern, such as the primary nozzles 8 having a linear arrangement shown in FIGS. 1-4. Alternatively, and as examples only, the oscillator nozzles may be arranged in a grid of three columns of three rows (see FIG. 53), in a circular pattern (see FIG. 54), in a "X" pattern (see FIG. 55), or in a in a "t" or cross pattern (see FIG. 56). However, the preferred showerhead primarily described herein includes six primary nozzles including two columns of three oscillator nozzles (see FIGS. 38-51 and 63-64).

As illustrated in FIGS. 38-45, each nozzle 145 is supplied by water from one of two port holes 167*a* or 167*b*. The port holes are located on an obstructor plate 161 which slides against the backside of the faceplate 143. Meanwhile, the obstructor plate's port holes 167*a* and 167*b* are spaced apart so that only one port hole can spray water completely through a nozzle 143 at any one moment. Movement of the obstructor plate against the face plate's backside causes the ports 167*a* or 167*b* to sequentially open and close. Preferably, the port holes are angled in different directions so port hole 167*a* closes from spraying water in a first direction, a second port hole 167*b* commences spraying water in an opposite direction to provide the appearance that the nozzle is sequentially spraying in opposite directions. For example, FIGS. 40A and 40B illustrate port holes 167*b* as aligned with oscillator nozzles 145 so as to spray water in an upward direction. At the same time, the alternate port holes 167*a* are blocked by the faceplate 143 from spraying water. As illustrated in FIGS. 41A and 41B, if the obstructor plate 161 is moved downwardly relative to the faceplate 143, port holes 165*b* become blocked from spraying water, and port holes 167*a* now align with the oscillator nozzles 145 so as to allow water to spray in an opposite direction. Preferable, to allow the obstructor plate to only move along one axis relative to the nozzle's faceplate 143, the oscillating nozzle assembly 141 includes a circular rim 147 which, in turn, includes sidewalls 153 for forming a center channel 151 which receives the obstructor plate 161. Meanwhile, the obstructor plate includes straight edges 163 positioned next to the channel's sidewall 153 so as to prevent the obstructor plate 161 from rotating. As illustrated in FIGS. 38-45, preferably the rear of the face assembly includes alignment tabs 155 which project through alignment slots formed in the obstructor plate which permit the obstructor plate to slide relative to the faceplate 143, but only within the one axis.

The oscillating nozzle assembly shown in FIGS. 38-45 further include a planetary gear assembly 171 which causes the obstructor plate 161 to oscillate back and forth. The planetary gear assembly includes a propeller 173 having vanes 174. The propeller 173 further includes a sun gear 175 which rotates a planet gear 178. The planet gear 178 is located at the end of a carrier arm 177 which rotates about a center shaft 179. The planetary gear assembly further includes a ring gear 176 which projects inwardly from the oscillating nozzle assembly's circular rim 147. The oscillating nozzle assembly further includes a back plate 183 which includes angled ports 185. Water passing through the angled ports engages the propeller's vanes 174 causing the propeller to rotate. Water passing the propeller veins then passes through the port holes 167*a* or 167*b* so as to be emitted from the oscillator nozzles 145. As would be understood by one skilled in the art, rotation of the propeller causes the planetary gear 178 to rotate about the center shaft 179. Furthermore, rotation of the planet gear 178 causes the carrier arm to rotate.

The carrier arm includes an offset pin 181 which projects through an elongate rocker hole 169 formed in the obstructor plate 161. Since the pin 181 is offset, it pushes the obstructor plate in opposite directions as the carrier arm 177 is rotated. As illustrated in FIGS. 38-45, rotation of the carrier arm 177 by 180 degrees will cause each set of port holes 167*a* and 167*b* to sequentially open and close. In turn, sequential opening and closing of the angled port holes 167*a* and 167*b* give the appearance and sensation that the oscillator nozzles themselves are oscillating side to side, when they are not.

While preferred showerhead assemblies have been illustrated and described, it would be apparent that various modifications can be made without departing from the spirit and scope of the invention. For example, features of the oscillating spray assembly may or may not be incorporated into any showerhead assembly including surface mounted or hand-held constructions. Conversely, a showerhead having a rotatable section to control water flow to the nozzles may or may not include oscillating nozzles or a finger lock assembly. Thus, it will be understood by those of skill in the art that any of the showerhead assemblies described herein, are meant to be illustrative only, and that the individual elements, or any combination of elements, depicted and/or described for a particular embodiment or figure are freely combinable with any other element, or any combination of other elements, depicted and/or described with respect to any of the other embodiments.

Accordingly, it is not intended that the invention be limited except by the following claims.

Having described my invention in such terms to enable a person skilled in the art to understand the invention, recreate the invention, and practice it, and having identified the presently preferred embodiments thereof, I claim:

1. A showerhead and wall mount assembly comprising:

a handheld showerhead including a showerhead, said showerhead having a backside, a front face, a plurality of nozzles projecting from said front face, an intake for receiving water, and at least one conduit connecting said intake to said nozzles for transporting water received from said intake to said nozzles;

a flexible hose having first and second ends with said first end being connected to said intake;

a finger lock including a shaft including a first end and a second end, said shaft's first end engaging said showerhead's backside with said shaft extending rearwardly from said showerhead's backside, said finger lock further including a radially extending flange which extends radially from said shaft's second end to form a space for receipt of a person's fingers between said showerhead's backside and said radially extending flange;

a showerhead mount including a cup and a backplate for attaching to a wall, said cup having a front side including two teeth separated to form a center recess, said cup is sufficiently large to receive said radially extending flange and said center recess is sized sufficiently large to receive said shaft, but said center recess is sized too small to allow said radially extending flange to pass through said center recess; and attachment means for attaching said showerhead mount to a wall.

2. The showerhead and wall mount assembly of claim 1 wherein said attachment means includes a suction cup.

3. The showerhead and wall mount assembly of claim 1 wherein said attachment means includes at least one screw.

* * * * *